United States Patent
Akagane et al.

(10) Patent No.: US 12,458,433 B2
(45) Date of Patent: Nov. 4, 2025

(54) TREATMENT INSTRUMENT

(71) Applicant: OLYMPUS CORPORATION, Hachioji (JP)

(72) Inventors: Tsunetaka Akagane, Hachioji (JP); Yusuke Takei, Kawasaki (JP); Kyoko Nozawa, Kunitachi (JP); Kazue Tanaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 815 days.

(21) Appl. No.: 17/675,341

(22) Filed: Feb. 18, 2022

(65) Prior Publication Data
US 2022/0168040 A1 Jun. 2, 2022

Related U.S. Application Data

(63) Continuation of application No. PCT/JP2019/032903, filed on Aug. 22, 2019.

(51) Int. Cl.
*A61B 18/14* (2006.01)
*A61B 18/00* (2006.01)
*A61B 18/12* (2006.01)

(52) U.S. Cl.
CPC ........ *A61B 18/1445* (2013.01); *A61B 2018/00922* (2013.01); *A61B 2018/1253* (2013.01); *A61B 2018/126* (2013.01); *A61B 2018/1422* (2013.01); *A61B 2018/1452* (2013.01)

(58) Field of Classification Search
CPC ............ A61B 18/1442; A61B 18/1445
See application file for complete search history.

(56) References Cited

U.S. PATENT DOCUMENTS

| | | | |
|---|---|---|---|
| 2005/0137590 A1 | 6/2005 | Lawes et al. | |
| 2008/0033428 A1* | 2/2008 | Artale | A61B 18/1442 606/51 |
| 2012/0136347 A1* | 5/2012 | Brustad | A61B 18/1445 606/46 |
| 2014/0257285 A1* | 9/2014 | Moua | A61B 18/1206 606/52 |

(Continued)

FOREIGN PATENT DOCUMENTS

| | | |
|---|---|---|
| JP | 2005-144192 A | 6/2005 |
| WO | 2015/099069 A1 | 7/2015 |

(Continued)

OTHER PUBLICATIONS

Oct. 15, 2019 International Search Report issued in International Patent Application No. PCT/JP2019/032903.

*Primary Examiner* — Ronald Hupczey, Jr.

(57) ABSTRACT

A treatment instrument that includes a first grasping member having a first grasping surface and a second grasping member having a second grasping surface. The treatment instrument includes a cover that covers at least a part of a region of at least one of the first and second grasping members other than the first and second grasping surfaces, and a pair of electrodes that are arranged on at least one of the first and second grasping surfaces to function as a bipolar electrode. An opening is provided in the cove, and a monopolar electrode arranged to overlap with the opening and is exposed to an outside of the treatment instrument through the opening.

19 Claims, 27 Drawing Sheets

(56) References Cited

U.S. PATENT DOCUMENTS

| | | | |
|---|---|---|---|
| 2015/0320485 A1* | 11/2015 | Batchelor | A61B 18/16 606/41 |
| 2016/0058496 A1* | 3/2016 | Joseph | A61B 18/1482 606/42 |
| 2016/0166307 A1 | 6/2016 | Takashino et al. | |
| 2019/0105100 A1* | 4/2019 | Bucciaglia | A61B 18/1445 |
| 2020/0054388 A1 | 2/2020 | Honda et al. | |

FOREIGN PATENT DOCUMENTS

| | | |
|---|---|---|
| WO | 2016/143793 A1 | 9/2016 |
| WO | 2018/198339 A1 | 11/2018 |

\* cited by examiner

TREATMENT INSTRUMENT

CROSS-REFERENCE TO RELATED APPLICATION

This application is a continuation of International Application No. PCT/JP2019/032903, filed on Aug. 22, 2019, the entire contents of which are incorporated herein by reference.

BACKGROUND

1. Technical Field

The present disclosure relates to a treatment instrument and a treatment system.

2. Related Art

In the related art, a treatment instrument to treat a living tissue by applying treatment energy to the living tissue has been known.

An example of the known treatment instrument includes a first grasping part that has a first grasping surface, a second grasping part that opens and closes relative to the first grasping part, and that has a second grasping surface to grasp a living tissue between itself and the first grasping surface, and an energy generating unit that generates a treatment energy to treat the living tissue. The energy generating unit applies a high-frequency energy, which is the treatment energy, to a living tissue grasped between the first and the second grasping surfaces.

SUMMARY

In at least some embodiments, a treatment instrument includes a first grasping member having a first grasping surface and a second grasping member having a second grasping surface, the first and second grasping surfaces are configured to grasp a living tissue; a cover configured to cover at least a part of a region of at least one of the first and second grasping members other than the first and second grasping surfaces of the first and second grasping members; a pair of electrodes respectively arranged on at least one of the first and second grasping surfaces, the pair of electrodes being configured to function as a bipolar electrode; an opening provided in the cover; and a monopolar electrode arranged to overlap with the opening and exposed to an outside of the treatment instrument through the opening, the monopolar electrode being configured to function as a monopolar electrode.

In at least some embodiments, a treatment instrument includes a sheath having a distal end and a proximal end; a monopolar electrode exposed to an outside of the treatment instrument when the sheath moves to a proximal end side; a first grasping member and a second grasping member arranged on a distal end side of the sheath, the first grasping member having a first grasping surface and the second grasping member having a second grasping surface, the first grasping surface and the second grasping surface being configured to grasp a living tissue; and a pair of electrodes arranged on at least one of the first grasping surface and the second grasping surface, the pair of electrodes being configured to function as a bipolar electrode.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, forms (hereinafter, embodiments) to implement the disclosure will be explained with reference to the accompanying drawings. The embodiments explained in the following are not intended to limit the disclosure. Furthermore, in description of the drawings, similar reference symbols are assigned to similar parts.

Schematic Configuration of Treatment System

Figure 1:
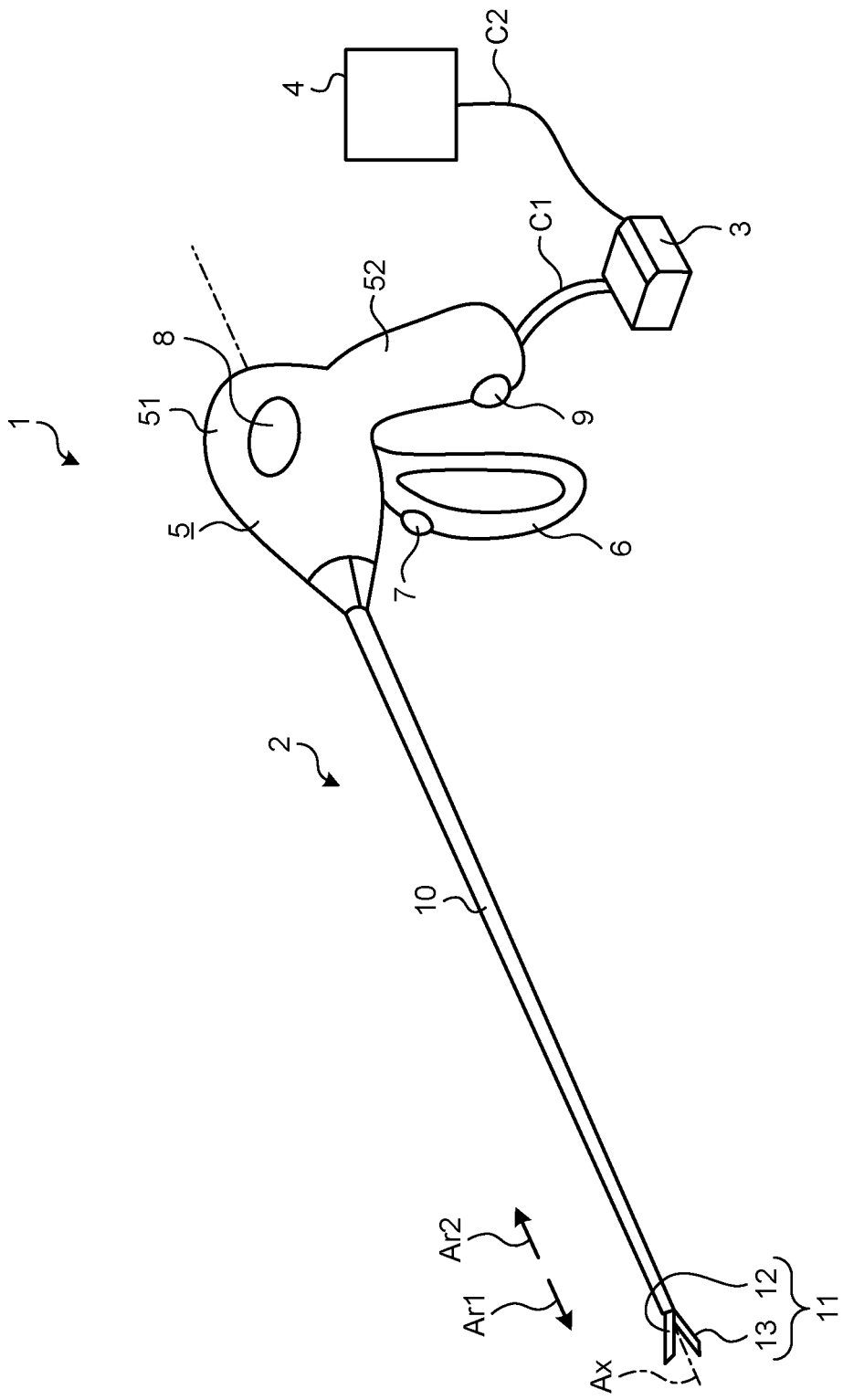
FIG. 1 is a diagram illustrating a treatment system according to an embodiment.

FIG. 1 is a diagram illustrating a treatment system 1 according to the present embodiment.

The treatment system 1 applies a treatment energy to a living tissue, and thereby treats the living tissue. The present embodiment adopts a high frequency energy and a heat energy as the treatment energy. Examples of a treatment enabled to be performed by the treatment system 1 include coagulation, incision, and the like. This treatment system 1 includes, as illustrated in FIG. 1, a treatment instrument 2, a control device 3, and a return electrode 4 that is electrically connected to the control device 3 through a second electric cable C2, and that is attached to a surface of a subject.

Configuration of Treatment Instrument

The treatment instrument 2 is a surgical treatment instrument to treat a target area, for example, through an abdominal wall. This treatment instrument 2 includes a holding case 5, an operating knob 6, first to a third switches 7 to 9, a shaft 10, and a grasping part 11 as illustrated in FIG. 1.

Hereinafter, for convenience of explanation, one side along a center axis Ax (FIG. 1) of the shaft 10 is denoted as a distal end side Ar1 (FIG. 1), and the other side is denoted as a proximal end side Ar2 (FIG. 1).

The holding case 5 supports the entire part of the treatment instrument 2. This holding case 5 includes a holding-case main body 51 that is positioned on the center axis Ax of the shaft 10, and a fixed handle 52 that extends downward in FIG. 1 from the holding-case main body 51 illustrated in FIG. 1 and that is grasped by an operator.

The operating knob 6 is axially supported in a rotatable manner relative to the holding case 5, and accepts a closing operation and an opening operation by the operator. More specifically, when the closing operation by the operator is accepted, the operating knob 6 rotates about the holding case 5, to be close to the fixed handle 52. On the other hand, when the opening operation by the operator is accepted, the operating knob 6 rotates about the holding case 5, to be apart from the fixed handle 52.

The first switch 7 is arranged in an exposed state to the outside from the operating knob 6, and accepts a depression (hereinafter, denoted as incision start operation) by the operator. The first switch 7 then outputs an operating signal according the incision start operation to the control device 3 through a first electric cable C1 (FIG. 1).

The second switch 8 is arranged in an exposed state to the outside from the operating knob 6, and accepts a depression (hereinafter, denoted as first treatment-start operation) by the operator. The second switch 8 then outputs an operating signal according to the first-treatment start operation to the control device 3 through the first electric cable C1.

The third switch 9 is arranged in an exposed state to the outside from a side surface of the fixed handle 52 on the distal end side Ar1, and accepts a depression (hereinafter, denoted as second treatment-start operation) by the operator. More specifically, the second treatment-start operation is an operation in which the third switch 9 is depressed by the operating knob 6 when the closing operation is performed with respect to the operating knob 6 by the operator. The third switch 9 then outputs an operating signal according to the second treatment-start operation to the control device 3 through the first electric cable C1.

The shaft 10 has a cylindrical shape, and is connected to the holding-case main body 51 at its end portion on the proximal end side Ar2. Moreover, to an end portion on the distal end side Ar1 of the shaft 10, the grasping part 11 is attached. Inside the shaft 10, an opening/closing mechanism (not illustrated) that opens and closes a first and a second grasping members 12, 13 (FIG. 1) according to an operation (the closing operation and the opening operation) of the operating knob 6 by the operator is arranged. Furthermore, inside the shaft 10, the first electric cable C1 is arranged from the proximal end side Ar2 to the distal end side Ar1 through the holding case 5.

Configuration of Grasping Part

Figure 2:
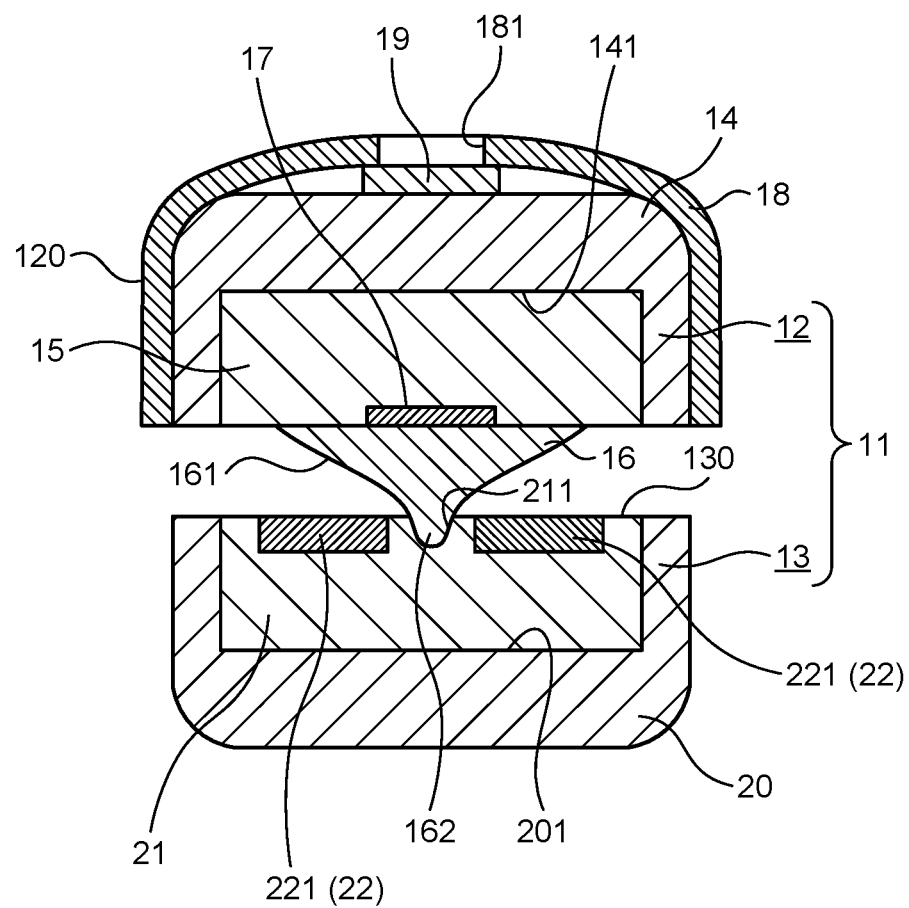
FIG. 2 is a diagram illustrating a grasping part.

FIG. 2 is a diagram illustrating the grasping part 11. Specifically, FIG. 2 is a cross-section cut along a plane perpendicular to the center axis Ax in a closed state in which the first and the second grasping members 12, 13 are closed.

The grasping part 11 is a part to treat a living tissue in a state in which the living tissue is grasped. This grasping part 11 includes the first and the second grasping members 12, 13 as illustrated in FIG. 1 or FIG. 2.

The first and the second grasping members 12, 13 are brought close to each other in response to the closing operation to the operating knob 6 made by the operator. Thus, the first and the second grasping members 12, 13 come into the closed state (FIG. 2) in which the living tissue is grasped between the first and the second grasping members 12, 13. On the other hand, the first and the second grasping members 12, 13 are brought apart from each other in response to the opening operation to the operating knob 6 made by the operator. Thus, the first and the second grasping members 12, 13 come into the open state in which the living tissue grasped between the first and the second grasping members 12, 13 is released.

Configuration of First Grasping Member

The first grasping member 12 is arranged at a position facing the second grasping member 13. This first grasping member 12 includes a first jaw 14, a first supporting member 15, a first bipolar electrode 16, a heater 17, a cover 18, and a monopolar electrode 19 as illustrated in FIG. 2.

The first jaw 14 is formed in a long shape extending in a longitudinal direction (direction along the center axis Ax) from a distal end to a proximal end of the grasping part 11. The first jaw 14 is attached to rotate about the shaft 10 with a coupling pin (not illustrated) at an end on the proximal end side Ar2, and opens and closes relative to the second grasping member 13 by revolving. This first jaw 14 is made from a metallic material, such as stainless and titanium to have certain rigidity.

In this first jaw 14, a concave portion 141 that is arranged at a central position in a width direction (left and right direction in FIG. 2) and that extends in a longitudinal direction of the grasping part 11 is arranged on a surface on the side closer to the second grasping member 13 as illustrated in FIG. 2.

The first supporting member 15 is a long flat plate extending in the longitudinal direction of the grasping part 11, and has a substantially the same outer shape as an inner shape of the concave portion 141. The first supporting member 15 is engaged in the concave portion 141. This first supporting member 15 is constituted of an insulating material having a low thermal conductivity, such as polyetheretherketone (PEEK). The first supporting member 15 is arranged between the first bipolar electrode 16 and the heater 17, and the first jaw 14. That is, by arranging the first supporting member 15, the first jaw 14 and the first bipolar electrode 16 are electrically insulated. Moreover, by arranging the first supporting member 15, transfer of heat toward the first jaw 14 from the heater 17 is suppressed, and the heat is effectively transferred to the first bipolar electrode 16.

The first bipolar electrode 16 is a portion that generates a high frequency energy under control of the control device 3, and corresponds to a first energy-generating unit according to the disclosure. This first bipolar electrode 16 is a long-shaped member that extends in the longitudinal direction of the grasping part 11, and is constituted of, for example, a conductive material, such as copper. The first bipolar electrode 16 is fixed to a surface on the side closer to the second grasping member 13 of the first supporting member 15.

In this first bipolar electrode 16, a surface on a side closer to the second grasping members 13 come into contact with a living tissue in a state in which the living tissue is grasped by the first and the second grasping members 12, 13. The surface functions as a first grasping surface 161 (FIG. 2) to apply a high frequency energy to the living tissue. In the present embodiment, the first grasping surface 161 has a convex shape in which a central portion in the width direction (left and right direction in FIG. 2) protrudes toward the grasping member 13. That is, the first bipolar electrode 16 has a substantially triangle cross-section as illustrated in FIG. 2. In the following, for convenience of explanation, the portion protruding toward the second grasping member 13 in the first bipolar electrode 16 is denoted as a convex portion 162 (FIG. 2).

To the first grasping surface 161, a coating agent having non-viscosity to a living body is applied, although specific illustration is omitted.

Moreover, the first bipolar electrode 16 is electrically connected to the control device 3 through a second supply path PA2 (refer to FIG. 4) including the first electric cable C1.

Although the first grasping surface 161 has a convex shape, it is not limited thereto, and it may be formed in other shapes, such as a flat surface and a concave shape.

The heater 17 is, for example, a sheet heater, and is arranged between the first bipolar electrode 16 and the first supporting member 15. Although illustration is omitted, this heater 17 is formed by evaporating an electric resistance pattern onto a sheet substrate formed with an insulating material, such as polyimide.

The electric resistance pattern is formed, for example, in a U-shape following along an outer rim shape of the heater 17. Moreover, both ends of the electric resistance pattern are electrically connected to the control device 3 through a fourth supply path (not illustrated) including the first electric cable C1. To the electric resistance pattern, an electric power is supplied through the fourth supply path under control of the control device 3 according to the incision start operation made with respect to the first switch 7 by the operator. Thus, the electric resistance pattern generates heat. Moreover, the heat of the electric resistance pattern is transferred to the living tissue grasped between the first and the second grasping members 12, 13 through the first bipolar electrode 16. In other words, to the living tissue, a heat energy is applied. The living tissue grasped between the first and the second grasping members 12, 13 is thus incised. That is, in the present embodiment, a configuration of thermally incising a living tissue grasped between the first and the second grasping members 12 and 13 is adopted.

The cover 18 is a member that covers surfaces (a side surface on the distal end side Ar1, a side surface on the proximal end side Ar2, respective side surfaces on both sides in a width direction (left and right direction in FIG. 2), and a rear surface (upper surface in FIG. 2) other than a surface on the side closer to the second grasping member 13 in the first jaw 14. That is, the cover 18 is arranged, in the first grasping member 12, on the surfaces (side surface on the distal end side Ar1, side surface on the proximal ends side Ar2, respective side surfaces on both sides in the width direction (left and right direction in FIG. 2), and rear surface (surface on an upper side in FIG. 2) other than the surface on the side closer to the second grasping member 13. In the following, for convenience of explanation, in the first grasping member 12, the surfaces other than the surface on the side closer to the second grasping member 13 is denoted as non-grasping surface 120 (FIG. 2). This cover 18 is constituted of an insulating material having a low thermal conductivity, such as PEEK. That is, by arranging the cover 18, even when the non-grasping surface 120 touches a non-target portion other than a target portion that is a subject to be treated in the living tissue, because the non-target portion and the first jaw 14 are electrically insulated, and temperature increase of the non-grasping surface 120 is suppressed, an unintended influence on the non-target portion is suppressed.

On a rear surface (surface on the upper side in FIG. 2) of this cover 18, an opening portion 181 (FIG. 2) that pierces through the cover 18 in a thickness direction is arranged.

The monopolar electrode 19 is a portion that generates a high frequency energy under control of the control device 3, and corresponds to a second energy generating unit according to the disclosure. This monopolar electrode 19 is, for example, constituted of a conducive material, such as a copper. The monopolar electrode 19 is attached on the rear surface of the cover 18 in an insulated state with respect to the first jaw 14. In this state, the monopolar electrode 19 exposes to the outside of the first grasping member 12 through the opening portion 181 as illustrated in FIG. 2.

In the monopolar electrode 19, although specific illustration is omitted, a coating agent having non-viscosity to a living body is applied on a surface (surface on the upper side in FIG. 2) exposing to the outside of the first grasping member 12 through the opening portion 181.

Moreover, the monopolar electrode 19 is electrically connected to the control device 3 through the first supply path PA1 (refer to FIG. 4) including the first electric cable C1. To a portion between the monopolar electrode 19 and the return electrode 4, a first high frequency power is supplied through the first supply path PA1 under control of the control device 3, according to the first treatment start operation made with respect to the second switch 8 by the operator. Thus, through a living tissue positioned between the monopolar electrode 19 and the return electrode 4, a high frequency current flows. In other words, to the living tissue, a high frequency energy is applied. The living tissue is thus coagulated (for example, hemostasis).

Configuration of Second Grasping Member

The second grasping member 13 includes a second jaw 20, a second supporting member 21, and a second bipolar electrode 22 as illustrated in FIG. 2.

The second jaw 20 is a portion formed by extending a part of the shaft 10 in the distal end side Ar1, and is formed in a long shape extending in the longitudinal direction of the grasping part 11.

In this second jaw 20, a concave portion 201 that is arranged at a central position in a width direction (left and right direction in FIG. 2) and that extends in the longitudinal direction of the grasping part 11 is arranged on a surface on the side closer to the first grasping member 12 as illustrated in FIG. 2.

The second supporting member 21 is a long flat plate extending in the longitudinal direction of the grasping part 11, and has a substantially the same outer shape as an inner shape of the concave portion 201. The second supporting member 21 is engaged in the concave portion 201. This second supporting member 21 is constituted of an insulating material having a low thermal conductivity, such as PEEK. The second supporting member 21 is arranged between the second bipolar electrode 22 and the second jaw 20. That is, by arranging the second supporting member 21, the first jaw 14 and the first bipolar electrode 16 are electrically insulated. Moreover, by arranging the first supporting member 15, transfer of heat toward the jaw 14 from the heater 17 is suppressed, and the heat is effectively transferred to the first bipolar electrode 16.

The second supporting member 21 is a long flat plate extending in the longitudinal direction of the grasping part 11, and has a substantially the same outer shape as an inner shape of the concave portion 201. The second supporting member 21 is engaged in the concave portion 201. This second supporting member 21 is constituted of an insulating material having a low thermal conductivity, such as PEEK. The second supporting member 21 is arranged between the second bipolar electrode 22 and the second jaw 20. That is, by arranging the second supporting member 21, the second jaw 20 and the second bipolar electrode 22 are electrically insulated. Moreover, by arranging the second supporting member 21, transfer of heat toward the second jaw 20 from the second bipolar electrode 22 is suppressed, and the second jaw 20 is prevented from becoming high temperature.

The second bipolar electrode 22 is a portion that generates a high frequency energy under control of the control device 3, and corresponds to a third energy-generating unit according to the disclosure. This second bipolar electrode 22 is a flat plate having a U-shape following along an outer rim shape of the second supporting member 21, and is constituted of, for example, a conductive material, such as copper. The second bipolar electrode 22 is embedded in a surface of the first grasping member 12 in the second supporting member 12 in a state in which both ends of the U-shape are directed to the proximal end side Ar2. In the following, for convenience of explanation, respective portions extending in the longitudinal direction of the grasping part 11 in the second bipolar electrode 22 are denoted as a pair of extending portions 221.

In the second bipolar electrode 22, the surface exposed to the outside (for example, surface on the upper side in FIG. 2), a coating agent having non-viscosity to a living body is applied, although specific illustration is omitted.

Furthermore, the second bipolar electrode 22 is electrically connected to the control device 2 through the third supply path (not illustrated) including the first electric cable C1. To a portion between the first and the second bipolar electrodes 16 and 22, a second high frequency power is supplied through the first supply path PA 1 and the third supply path under control of the control device 3 according to the second treatment start operation made with respect to the third switch 9 by the operator. Thus, through the living tissue grasped between the first and the second grasping members 12, 13, a high frequency electric current flows. In other words, to the living tissue, a high frequency energy is applied. The living tissue is thus coagulated (for example, hemostasis).

In the second supporting member 21, as illustrated in FIG. 2, a groove portion 211 in which the convex portion 162 fits when the first and the second grasping members 12, 13 are in the closed state is arrange in a portion between the pair of the extending portions 221.

In the second grasping member 13 explained above, the surface on the side closer to the first grasping member 12 (surface on the upper side in FIG. 2) functions as the second grasping surface 130 to grasp a living tissue between itself and the first grasping surface 161.

In the present embodiment, a structure in which the second grasping member 13 is fixed to the shaft 10, and the first grasping member 12 is axially supported relative to the shaft 10 is adopted, but it is not limited thereto. For example, a structure in which the first and the second grasping members 12, 13 are both axially supported relative to the shaft 10, and the first and the second grasping members 12, 13 open and close as the respective members revolve may be adopted. Moreover, for example, a structure in which the second grasping member 13 is axially supported relative to the shaft 10, the first grasping member 12 is fixed to the shaft 10, and the second grasping member 13 revolves, and thereby opens and closes relative to the first grasping member 12 may be adopted.

Configuration of Control Device

Figure 3:
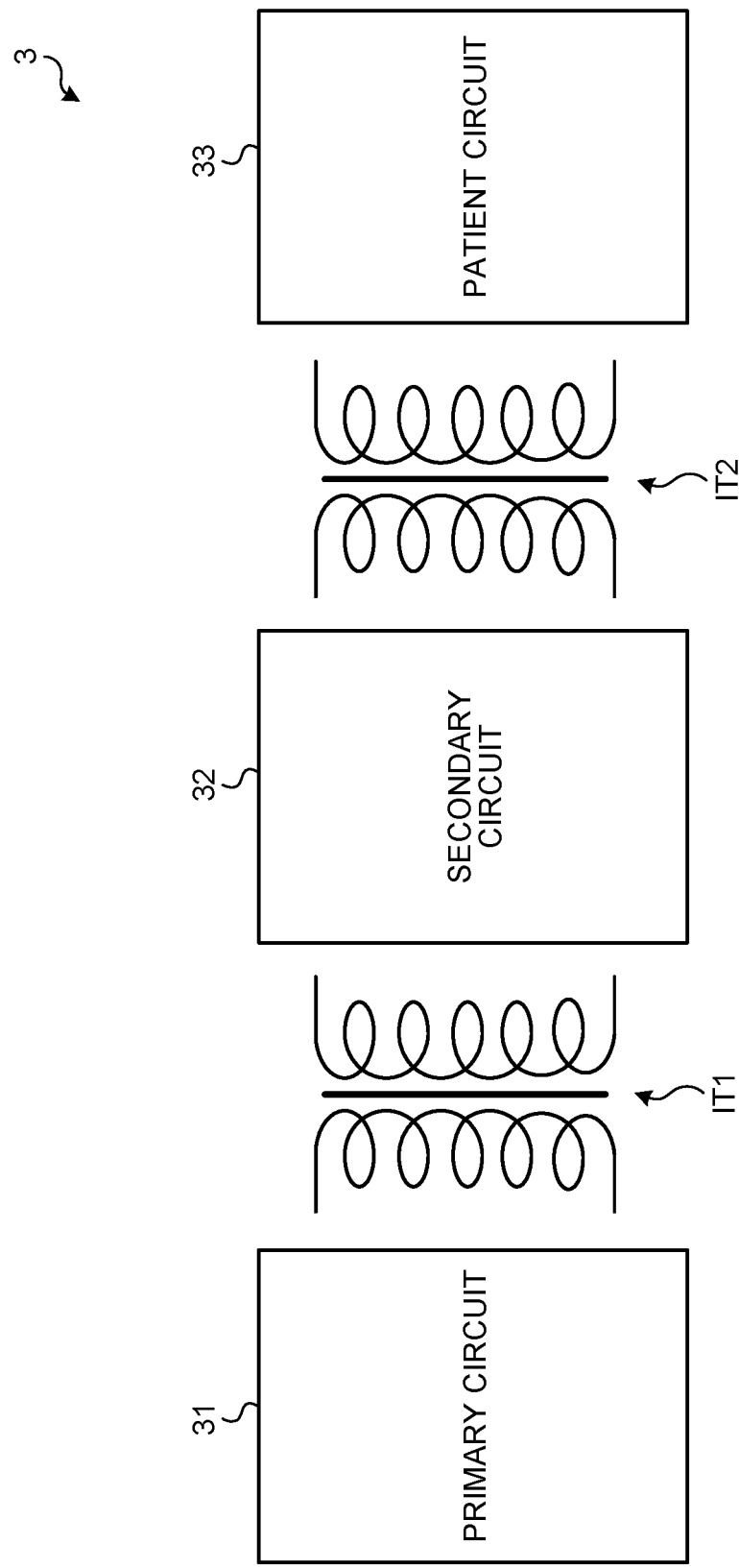
FIG. 3 is a diagram illustrating a configuration of a control device.

FIG. 3 is a diagram illustrating a configuration of the control device 3.

The control device 3 is broadly divided into three circuits (a primary circuit 31, a secondary circuit 32, and a patient circuit 33) as illustrated in FIG. 3.

The primary circuit 31 is connected to a utility power source (not illustrated) through an inlet (not illustrated), and is a circuit that supplies an electric power from the utility power source to the secondary circuit 32.

To the secondary circuit 32, an electric power (AC signal) is supplied through a first insulating device IT1 (FIG. 3). That is, the primary circuit 31 and the secondary circuit 32 are electrically insulated. The secondary circuit 32 converts the AC signal from the primary circuit 31 into a direct current, and a voltage converted into a direct current is boosted to a high voltage by a DC-DC. Moreover, the secondary circuit 32 includes a processor (not illustrated) that controls, based on a signal detected by the patient circuit 33, a power supplied to the heater 17 (electric resistance pattern) from the patient circuit 33, the first high frequency power supplied to the portion between the monopolar electrode 19 and the return electrode 4 from the patient circuit 33, and the second high frequency power supplied to the portion between the first and the second bipolar electrodes 16, 22 from the patient circuit 33.

To the patient circuit 33, a power is supplied through a second insulating device IT2 (FIG. 3). That is, the secondary circuit 32 and the patient circuit 33 are electrically insulated. The patient circuit 33 includes an output circuit that performs power supply to the heater 17, supply of the first high frequency power to the portion between the monopolar electrode 19 and the return electrode 4, and supply of the second high frequency power to the portion between the first and the second bipolar electrodes 16, 22, based on the power supplied by the secondary circuit 32. Moreover, the patient circuit 33 includes a sensor to detect a voltage value or a current value of the power supplied to the heater 17, a voltage value and a current value of the first high frequency power supplied to the portion between the monopolar electrode 19 and the return electrode 4, and a voltage value or a current value of the second high frequency power supplied to the portion between the first and the second bipolar electrodes 16, 22.

In the first and the second supply paths PA1, PA2, first and the second switches SW1, SW2 are arranged.

Figure 4:
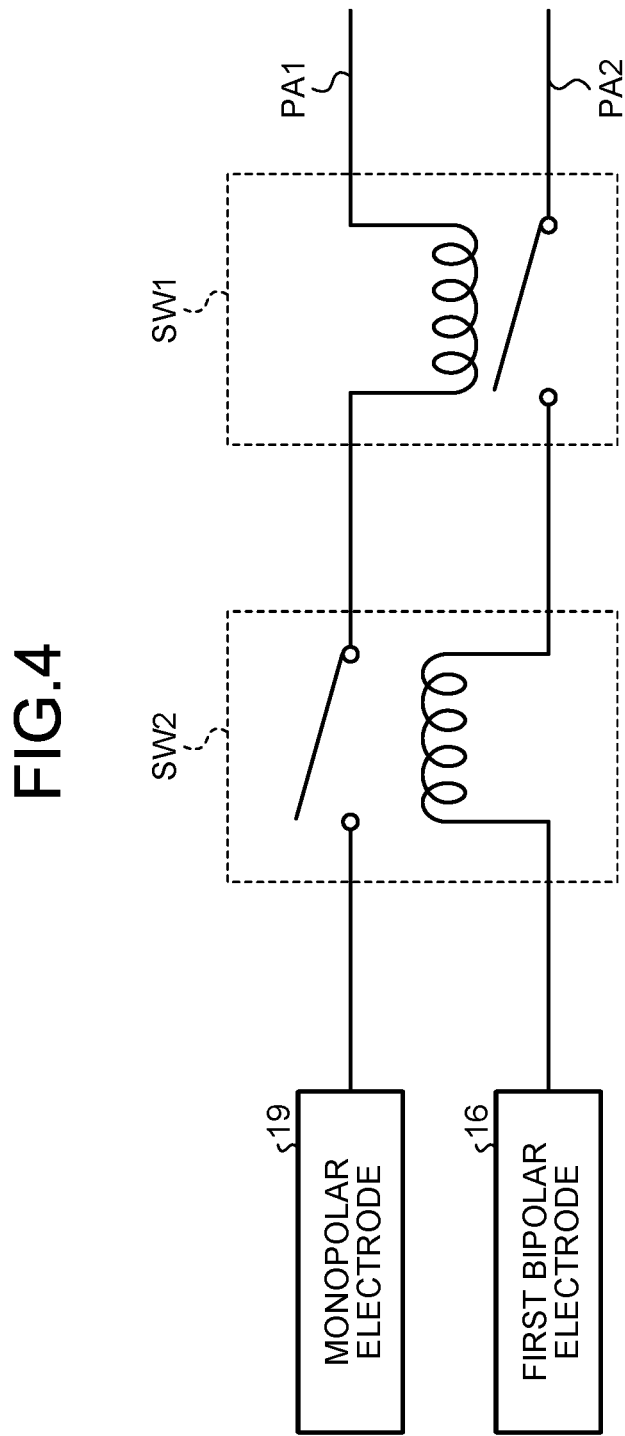
FIG. 4 is a diagram illustrating a first and a second switches.

FIG. 4 is a diagram illustrating the first and the second switches SW1, SW2.

The first switch SW1 is constituted of, for example, a relay switch. The first switch SW1 shuts the second supply path PA2 when the first high-frequency power is supplied to the monopolar electrode 19 by the first supply path PA1.

The second switch SW2 is constituted of, for example a relay switch. The second switch SW2 shuts the first supply path PA1 when the second high-frequency power is supplied to the first bipolar electrode 16 by the second supply path PA1.

Examples of positions at which the first and the second switches SW1, SW2 explained above are arranged include a portion positioned inside the treatment instrument 2 (in the shaft 10, in the holding case 5, or the like) in the first and the second supply paths PA1 and PA2, and a portion positioned inside the patient circuit 33 in the first and the second supply paths PA1 and PA2.

The treatment instrument 2 explained above may be configured to be disposed after one use, or may be configured to be used repeatedly for multiple times. When it is configured to e repeatedly used for multiple times, for example, refabrication by a first reprocessing method illustrated in FIG. 5, or refabrication by a second reprocessing method illustrated in FIG. 6 is necessary.

In the following, the first and the second reprocessing methods are explained sequentially.

First Reprocessing Method

Figure 5:
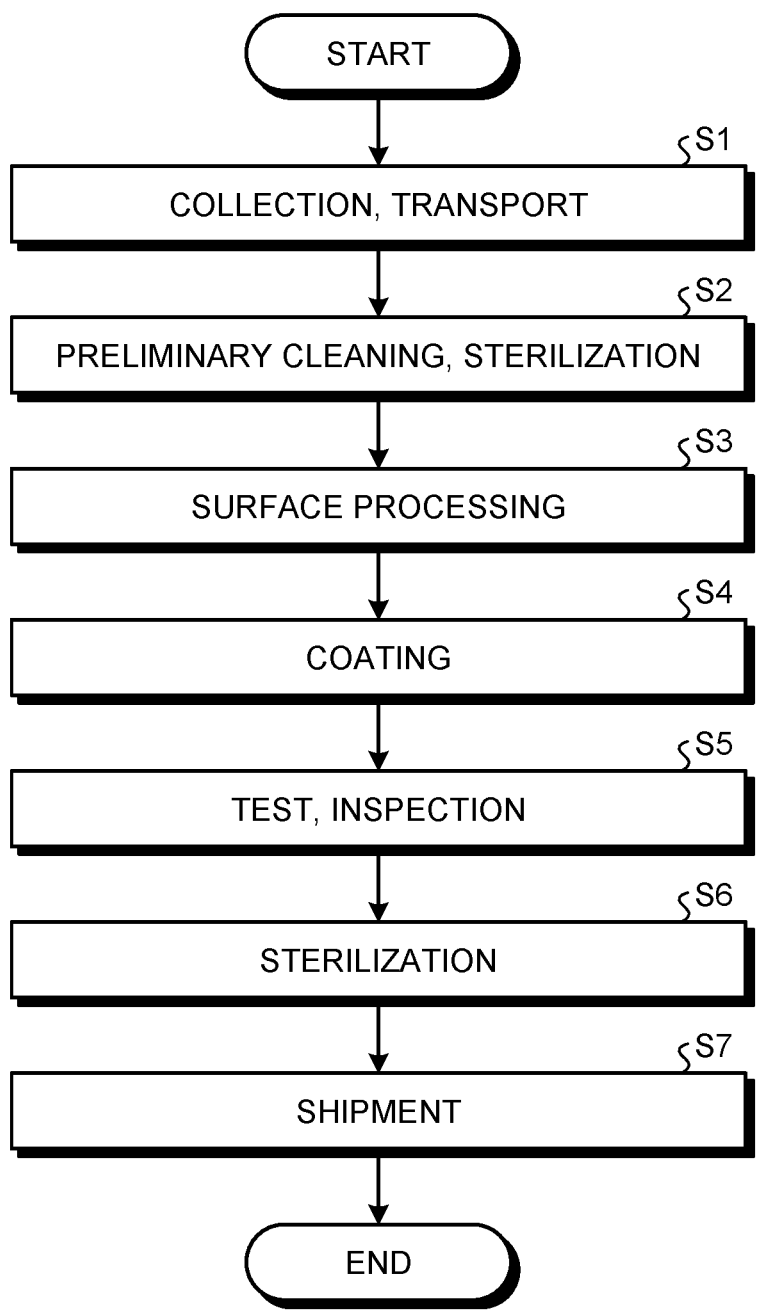
FIG. 5 is a flowchart of a first reprocessing method.
Figure 6:
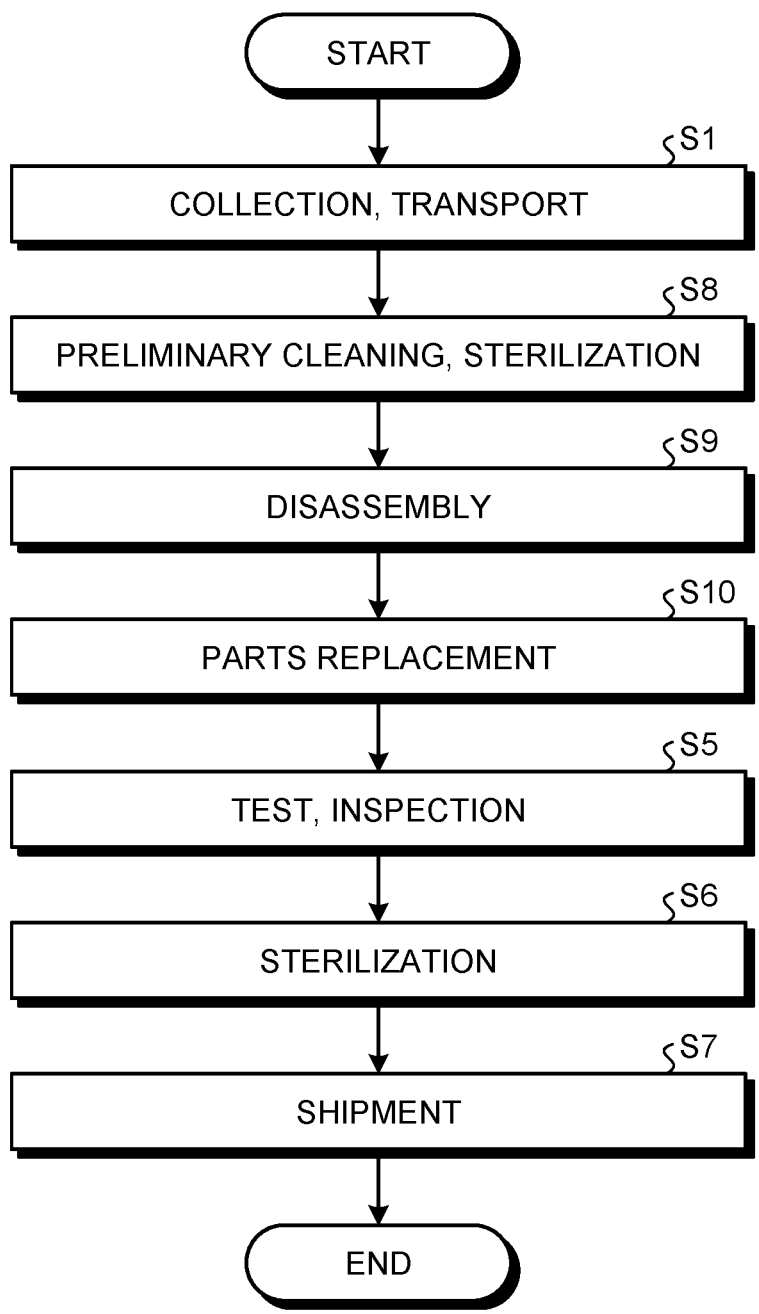
FIG. 6 is a flowchart of a second reprocessing method.

FIG. 5 is a flowchart of the first reprocessing method.

First, a manufacturer and seller that is engaged in refabrication collects the used treatment instrument 2 after used for treatment, and transport it to a factory, or the like (step S1). At this time, the used treatment instrument 2 is transported in a dedicated container to prevent contamination from the treatment instrument 2.

After step S1, the manufacturer and seller performs cleaning and sterilization of the used treatment instrument 2 that has been collected and transported (step S2).

Specifically, in the cleaning of the treatment instrument 2, by using a brush or the like, materials adhered on the first and the second bipolar electrodes 16, 22 and the monopolar electrode 19 are removed. Thereafter, to eliminate pathogenic microorganisms and the like derived from blood, body fluid, and the like, either cleaning solution of an isopropanol contained cleaning agent, a proteolytic enzyme cleaning agent, and alcohol is used to clean the first and the second bipolar electrodes 16, 22, and the monopolar electrode 19. The cleaning solution is not limited to the cleaning solution described above, but other cleaning solutions may be adopted. Moreover, in sterilization of the treatment instrument 2, to sterilize pathogenic microorganisms and the like adhered to the first and the second bipolar electrodes 16, 22, and the monopolar electrode 19, either one of high-pressure steam sterilization, ethylene oxide gas sterilization, gamma sterilization, and low temperature sterilization using hydrogen peroxide gas is used. Furthermore, it is preferable that either before or after, or both before and after the sterilization described above, surface polish, such as blasting and acid bathing, be performed for the purpose of removing dirt or deteriorated coating.

After step S2, the manufacturer and seller that is performs refabrication performs surface processing with respect to the first and the second bipolar electrode 16, 22, and the monopolar electrode 19 (step S3).

Specifically, by performing at least one of processing using CrN or TiN, and plasma processing to modify with hexamethyldisiloxane (HMDSO) or OH radicals as a primary processing, the coating agent having non-viscosity to a living body that is applied respectively to the first, and the second bipolar electrodes 16, 22, and the monopolar electrode 19 is strongly appressed thereto.

When the plasma processing described above is low temperature plasma, because costly rare gases, such as helium, neon, argon, krypton, xenon, and radon, are necessary to be sued, it is preferable that these rare gases be collected for reuse. Furthermore, as another method of applying a polar functional group necessary to improve intimate adhesion of the coating agent on a surface, surface reforming by laser irradiation of corona, excimer, or short pulse laser may be used.

After step S3, the manufacturer and seller that performs refabrication newly applies a coating agent having non-viscosity to a living body respectively on the first and the second bipolar electrodes 16, 22, and the monopolar electrode 19 (step S4). As described, by the surface processing at step S3 and the coating at step S4, the coating agent worn out as it has been used for treatment is appropriately removed, and coating having a desirable non-viscosity can be applied. Moreover, in the coating at step S4, it is preferable to use a different one from either one or both of a coating agent that has originally been used, and a processing method, because a processing situation varies.

After step S4, the manufacturer and seller that performs refabrication performs an inspection and test of the treatment instrument 2 newly fabricated (step S5).

Specifically, the manufacturer and seller that performs refabrication verifies that the newly fabricated treatment instrument 2 has effectiveness and safety equivalent to the original product by various kinds of functional tests.

After step S5, the manufacturer and seller that performs refabrication performs packaging of the newly fabricated treatment instrument 2, and then performs second sterilization (step S6).

Specifically, sterilizability at manufacturing is guaranteed by using a sterilization indicator, such as biological indicator (BI).

Finally, the manufacturer and seller that performs refabrication makes shipment (step S7).

Second Reprocessing Method

FIG. 6 is a flowchart of a second reprocessing method. The second reprocessing method differs from the first reprocessing method in a point in which steps S8 to S10 are adopted instead of steps S2 to S4 as illustrated in FIG. 6. In the following, only steps S8 to S10 will be explained.

Step S8 is performed after step S1.

The manufacturer and seller that performs refabrication performs cleaning and sterilization of the collected and transported used treatment instrument 2 at step S8.

Specifically, in the cleaning of the treatment instrument 2, by using a brush or the like, materials adhered on the treatment instrument 2 are removed. Thereafter, to eliminate pathogenic microorganisms and the like derived from blood, body fluid, and the like, either cleaning solution of an isopropanol contained cleaning agent, a proteolytic enzyme cleaning agent, and alcohol is used to clean the treatment instrument 2. The cleaning solution is not limited to the cleaning solution described above, but other cleaning solutions may be adopted. Moreover, in sterilization of the treatment instrument 2, to sterilize pathogenic microorganisms and the like adhered to the treatment instrument 2, either one of high-pressure steam sterilization, ethylene oxide gas sterilization, gamma sterilization, and low temperature sterilization using hydrogen peroxide gas is used.

After step S8, the manufacturer and seller that performs refabrication disassembles the first grasping member 12 from the shaft 10 by removing the coupling pin (not illustrated) to couple the first jaw 14 and the shaft (step S9).

After step S9, the manufacturer and seller that performs refabrication performs parts replacement (step S10). Because the first bipolar electrode 16 and the monopolar electrode 19 in the first grasping member 12 are deteriorated by treatment, it is preferable to be replaced when reused. Specifically, the first grasping member 12 that has been used is disassembled from the shaft 10 at step S9, and the new unused first grasping member 12 is attached to the shaft 10 with the coupling pin (not illustrated) at step S10. Because the first jaw 14 and the shaft 10 do not require welding and has a mark at an electrical contact, the first jaw 14 is made easy to be attached and detached with respect to the shaft 10.

After step S10, processing shifts to step S5.

The treatment instrument 2 may be configured to have a memory to store the number of use, date and time of use, the number of refabrication in the holding case 5, at the first electric cable C1, a joint portion of the first electric cable C1 and the control device 3, or the like. For example, by providing a function of inhibiting output of a treatment energy when predetermined time has passed since date and time of use stored in the memory, it is possible to prevent it from being used again by a user. Furthermore, by resetting information of date and time of use in the memory at step S10 or the like, only the treatment instrument 2 that has been subjected to an appropriate refabrication process can be used again, and safety of the treatment instrument 2 can be ensured. Moreover, for example, by checking the number of times of refabrication stored in the memory, it is possible to determine whether it has exceeded an upper limit of the number of times of refabrication of the treatment instrument 2. Thus, safety and performance of the refabricated treatment instrument 2 can be guaranteed. Moreover, it is preferable to provide a system for changing output settings for treatment to appropriate settings depending on whether it has been refabricated, and on the number of times of refabrication in the control device 3. Furthermore, it is preferable that the memory be arranged in a replaceable manner regardless of whether disassembly is necessary, and it is preferable that the memory be provided, for example, from a manufacturer to a refabrication company, and the thus provided memory be rewritten at the time of refabrication. Alternatively, it is also preferable that a rewriting means of a memory is provided by a manufacturer to a refabrication company, and the memory be rewritten at refabrication.

According to the embodiment explained above, the following effects are obtained.

In the treatment instrument 2 according to the present embodiment, the monopolar electrode 19 described above is arranged on the non-grasping surface 120 of the first grasping member 12.

Therefore, according to the treatment instrument 2 according to the present embodiment, even when a living tissue is not grasped between the first and the second grasping surfaces 161 and 130, the living tissue can be treated by the monopolar electrode 19, and convenience can be improved.

Moreover, on the first and the second grasping surfaces 161, 130, the first and the second bipolar electrodes 16, 22 described above are arranged.

Therefore, a living tissue grasped between the first and the second grasping surfaces 161 and 130 can also be treated by the first and the second bipolar electrodes 16, 22, and convenience can further be improved.

Furthermore, the monopolar electrode 19 is arranged on the rear surface of the first grasping member 12.

Therefore, the monopolar electrode 19 can have a large area, and hemostasis (coagulation) of a large area can be performed by using the monopolar electrode 19.

Moreover, the monopolar electrode 19 is arranged at a position offset to the inside from the outer surface of the first grasping member 12 as much as the thickness of the cover 18.

Therefore, the monopolar electrode 19 has a structure less prone to contact a living tissue, and clinging of the monopolar electrode 19 to a living tissue can be suppressed.

Moreover, in the first and the second supply paths PA1, PA2, the first and the second switches SW1, SW2 described above are provided.

Therefore, a leakage current from the monopolar electrode 19 to the second supply path PA2, or a leakage current to the first supply path PA1 from the first bipolar electrode 16 can be suppressed.

Other Embodiments

The embodiment to implement the disclosure has so far been explained, but the disclosure is not to be limited only to the embodiment described above. For example, first to nineteenth modifications described below may be adopted.

First Embodiment

Figure 7:
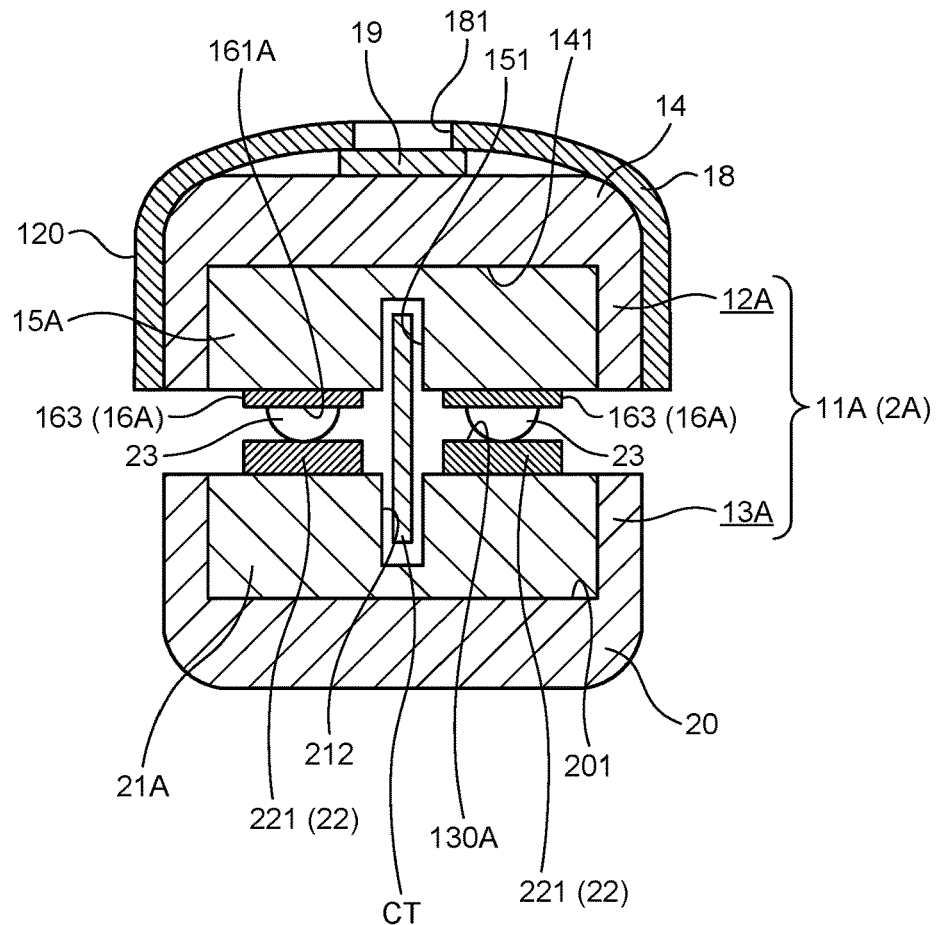
FIG. 7 is a diagram illustrating a first modification of the embodiment.

FIG. 7 is a diagram illustrating a first modification of the present embodiment. Specifically, FIG. 7 is a cross-section corresponding to FIG. 2.

In the treatment instrument 2 according to the embodiment described above, a configuration in which a living tissue grasped between the first and the second grasping members 12, 13 is thermally incised is adopted, but it is not limited thereto. For example, a configuration of a grasping part 11A (first and second grasping members 12A, 13A) in a treatment instrument 2A according to the first modification illustrated in FIG. 7 may be adopted, and a configuration to mechanically incise a living tissue grasped between the first and the second grasping members 12A and 13A may be adopted.

The first grasping member 12A differs from the first grasping member 12 explained in the embodiment described above in a point in which the heater 17 is omitted, and a first supporting member 15A and a first bipolar electrode 16A are adopted in place of the first supporting member 15 and the first bipolar electrode 16.

The first supporting member 15A differs from the first supporting member 15 explained in the above embodiment in a point in which a cutter groove portion 151 is provided.

The cutter groove portion 151 is arranged at a central portion in a width direction of a surface on a side closer to the second grasping member 13A in the first supporting member 15A as illustrated in FIG. 7.

The first bipolar electrode 16A has a different shape from the first bipolar electrode 16 explained in the embodiment described above.

Specifically, the first bipolar electrode 16A is a flat plate having a U-shape planarly surrounding the cutter groove portion 151. The first bipolar electrode 16A is fixed to a surface on a side closer to the second grasping member 13A in the first supporting member 15A in a state where both ends of the U-shape is on a proximal end side Ar2, and in a state facing the second bipolar electrode 22 when the first and the second grasping members 12A, 13A are in a closed state. In the following, for convenience of explanation, in the first bipolar electrode 16A, respective portions extending in a longitudinal direction (direction along the center axis Ax) of the grasping part 11A are denoted as a pair of extending portions 163 (FIG. 7).

In the first modification, in the first bipolar electrode 16A, a surface on the side closer to the second grasping member 13A serves as a first grasping surface 161A (FIG. 7). Moreover, on the first grasping surface 161A, similarly to the first grasping surface 161 explained in the embodiment described above, a coating agent (not illustrated) having non-viscosity to a living body is applied.

In the first grasping member 12A, as illustrated in FIG. 7, a dome-shaped abutting portion 23 constituted of an insulating material is provided.

The abutting portion 23 protrudes toward the second grasping member 13A relative to the first grasping surface 161A. The abutting portion 23 abuts on the second bipolar electrode 22 when the first and the second grasping members 12A, 13A are in a closed state. That is, the abutting portion 23 prevents short circuit of the first and the second bipolar electrodes 16A and 22.

The second grasping member 13A differs from the second grasping member 13 explained in the embodiment described above in a point in which a second supporting member 21A is adopted in place of the second supporting member 21 as illustrated in FIG. 7.

The second supporting member 21A differs from the second supporting member 21 explained in the embodiment described above in a point in which a cutter groove portion 212 is provided.

The cutter groove portion 212 is arranged at a central portion in a width direction of a surface on a side closer to the first grasping member 12A in the second supporting member 21A as illustrated in FIG. 7, and faces the cutter groove portion 151 when the first and the second grasping members 12A, 13A are in the closed state.

In the first modification, the second bipolar electrode 22 is fixed to a surface on a side closer to the first grasping member 12A in the second supporting member 21A in a state planarly surrounding the cutter groove portion 212. In the second bipolar electrode 22, the surface on the side closer to the first grasping member 12A serves as a second grasping surface 130A. Moreover, to the second grasping surface 130A, similarly to the second grasping surface 130 explained in the embodiment described above, a coating agent (not illustrated) having non-viscosity to a living body is applied.

Moreover, in the first modification, as illustrated in FIG. 7, a cutter CT that is positioned in the cutter groove portions 151, 212 and that moves forward and backward along the longitudinal direction of the grasping part 11A according to an operation made with respect to an operating lever (not illustrated) by an operator is provided to the grasping part 11A is provided. That is, a living tissue grasped between the first and the second grasping members 12A and 13A is incised by a forward and backward movement of the cutter CT.

Also when the first modification explained above is adopted, a similar effect as the embodiment described above is obtained.

Second Modification

Figure 8:
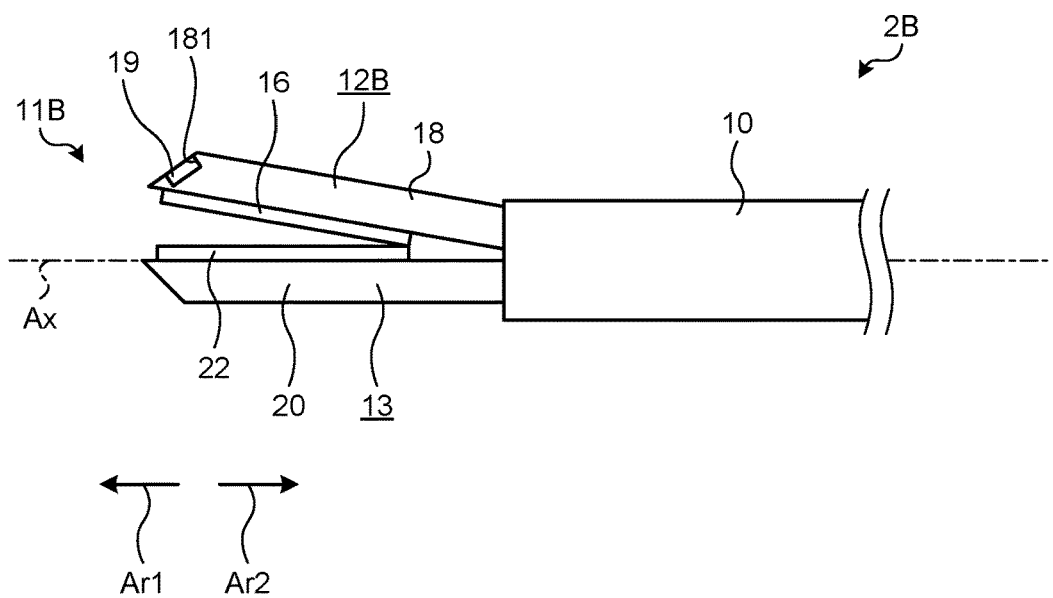
FIG. 8 is a diagram illustrating a second modification of the embodiment.

FIG. 8 is a diagram illustrating a second modification of the present embodiment. Specifically, FIG. 8 is a side view of a portion on the distal end side Ar1 of a treatment instrument 2B according to the second modification viewed from a direction perpendicular to the center axis Ax.

In the treatment instrument 2 according to the embodiment described above, the monopolar electrode 19 and the opening portion 181 are arranged on the rear surface of the first grasping member 12, but it is not limited thereto. For example, adopting a configuration of a grasping part 11B (first and second grasping members 12B, 13) in the treatment instrument 2B according to the second modification illustrated in FIG. 8, the monopolar electrode 19 and the opening portion 181 may be arranged on a surface on the side closer to the distal end side Ar1 in the first grasping member 12B.

Also when the second modification explained above is adopted, a similar effect as the embodiment described above is obtained.

Moreover, because the monopolar electrode 19 has a small area on the distal end side Ar1, by using the monopolar electrode 19, for example, a local hemostasis (coagulation) can be performed.

The configuration of the second modification may be adopted to the configuration of the first modification described above in which a living tissue is mechanically incised.

Third Modification

Figure 9:
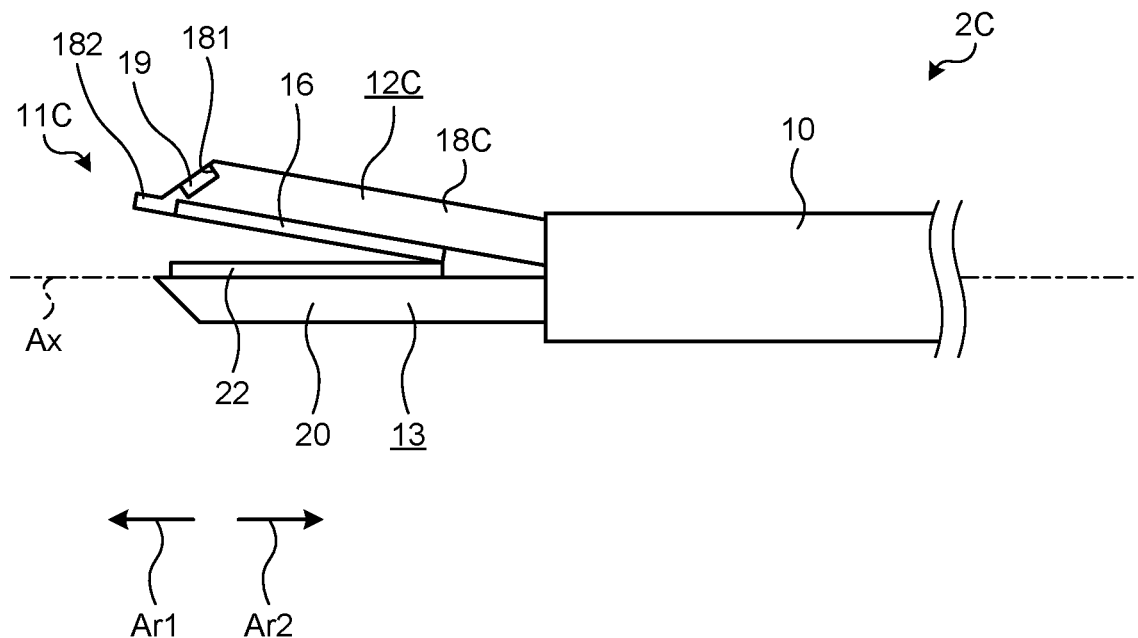
FIG. 9 is a diagram illustrating a third modification of the embodiment.

FIG. 9 is a diagram illustrating a third modification of the present embodiment. Specifically, FIG. 9 is a side view of a portion on the distal end side Ar1 of a treatment instrument 2C according to the third modification viewed from the direction perpendicular to the center axis Ax.

A grasping part 11C (first and second grasping members 12C, 13) in the treatment instrument 2C according to the third modification differs from the grasping part 11B according to the second modification described above in a point in which the shape of the cover 18 is changed as illustrated in FIG. 9. In the following, the cover 18 according to the third modification is denoted as cover 18C (FIG. 9).

The cover 18C differs from the cover 18 explained in the second modification described above in a point in which a protruding portion 182 (FIG. 9) is provided at a position between the first bipolar electrode 16 and the monopolar electrode 19.

Also when the third modification explained above is adopted, a similar effect as the second modification described above is obtained.

Moreover, according to the third modification, by the protruding portion 182, a creepage distance between the first bipolar electrode 16 and the monopolar electrode 19 can be increased. Accordingly, it is possible to suppress flow of at least a part of a high frequency current into the monopolar electrode 19 from the first bipolar electrode 16 when the high frequency current is applied to a living tissue grasped between the first and the second grasping members 12C and 13. Therefore, the living tissue can be treated preferably, and an unintended influence on a non-target portion other than a target portion that is a subject to be treated in the living tissue through the monopolar electrode 19 can be suppressed.

Fourth Modification

Figure 10:
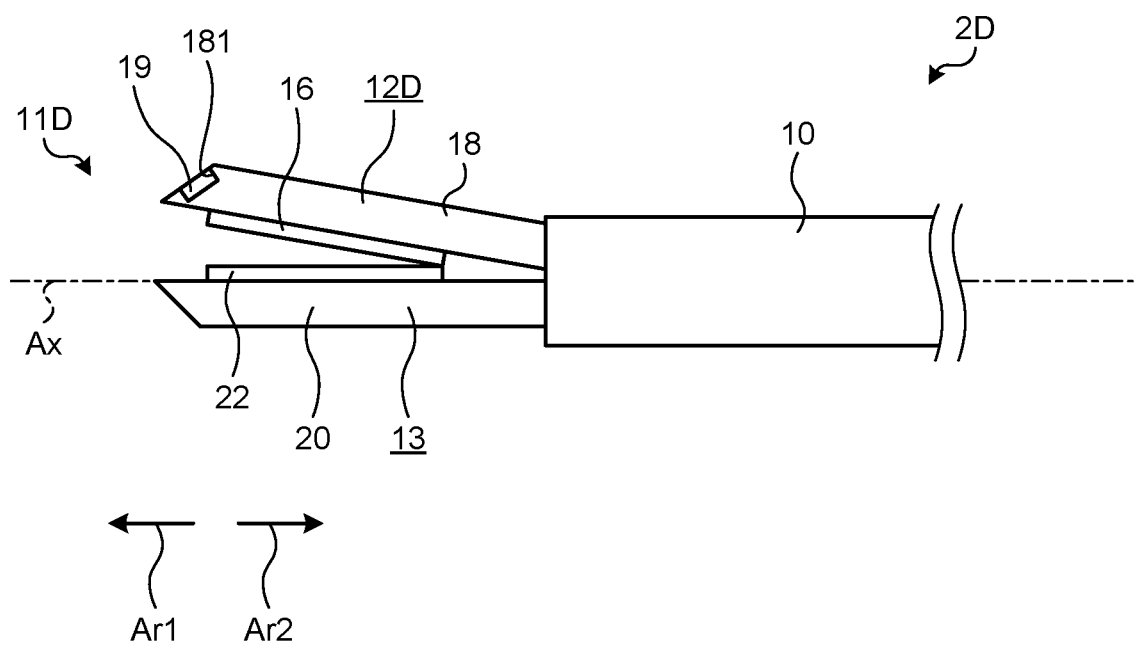
FIG. 10 is a diagram illustrating a fourth modification of the embodiment.

FIG. 10 is a diagram illustrating a fourth modification of the present embodiment. Specifically, FIG. 10 is a side view of a portion on the distal end side Ar1 of a treatment instrument 2D according to the fourth modification viewed from the direction perpendicular to the center axis Ax.

A grasping part 11D (first and second grasping members 12D, 13) in the treatment instrument 2D according to the fourth modification differs from the grasping part 11B according to the second modification described above in a point in which a position at which the first bipolar electrode 16 is arranged is changed as illustrated in FIG. 10.

The first bipolar electrode 16 is arranged at a position not aligned to the monopolar electrode 19 along the direction perpendicular to a longitudinal direction of a first grasping member 12D. That is, the first bipolar electrode 16 according to the fourth modification is arranged on the proximal end side Ar2 relative to the first bipolar electrode 16 according to the second modification described above.

The second bipolar electrode 22 is also arranged at a position facing the position of the first bipolar electrode 16.

Also when the fourth modification explained above is adopted, a similar effect as the second modification described above is obtained.

Moreover, according to the fourth modification, because the creepage distance between the first bipolar electrode 16 and the monopolar electrode 19 can be increased, a similar effect as the third modification described above is obtained. Furthermore, because the first bipolar electrode 16 and the monopolar electrode 19 are not aligned along the direction perpendicular to the longitudinal direction of the first grasping member 12D, the grasping part 11D can be made thin.

Fifth Modification

Figure 11:
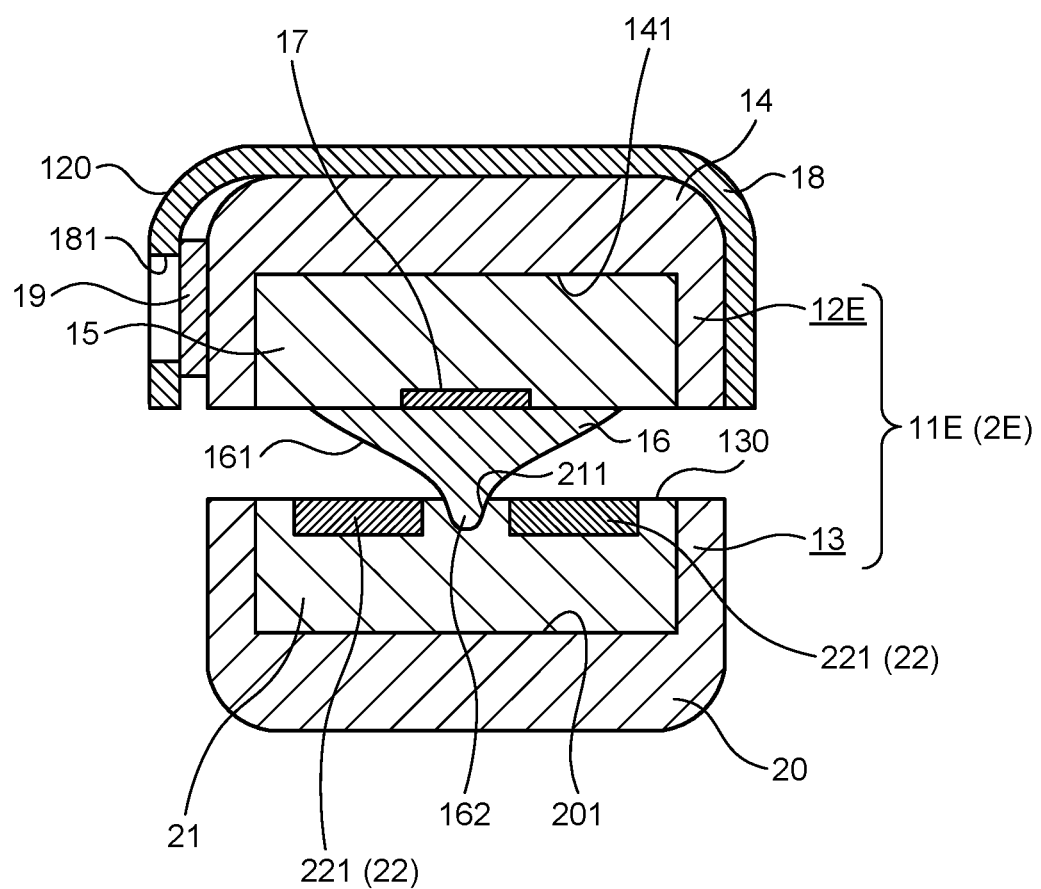
FIG. 11 is a diagram illustrating a fifth modification of the embodiment.

FIG. 11 is a diagram illustrating a fifth modification of the present embodiment. Specifically, FIG. 11 is a cross-section corresponding to FIG. 2.

In the treatment instrument 2 according to the embodiment described above, the monopolar electrode 19 and the opening portion 181 are arranged on the rear surface of the first grasping member 12, but it is not limited thereto. For example, a configuration of a grasping part 11E (first and second grasping members 12E, 13) in a treatment instrument 2E according to the fifth modification illustrated in FIG. 11 may be adopted, and the monopolar electrode 19 and the opening portion 181 may be arranged on a one side surface in a width direction (left and right direction in FIG. 11) in the first grasping member 12E.

Also when the fifth modification explained above is adopted, a similar effect as the embodiment describe above is obtained.

The configuration of the fifth modification may be adopted to the configuration of the first modification in which a living tissue is mechanically incised described above.

Sixth Modification

Figure 12:
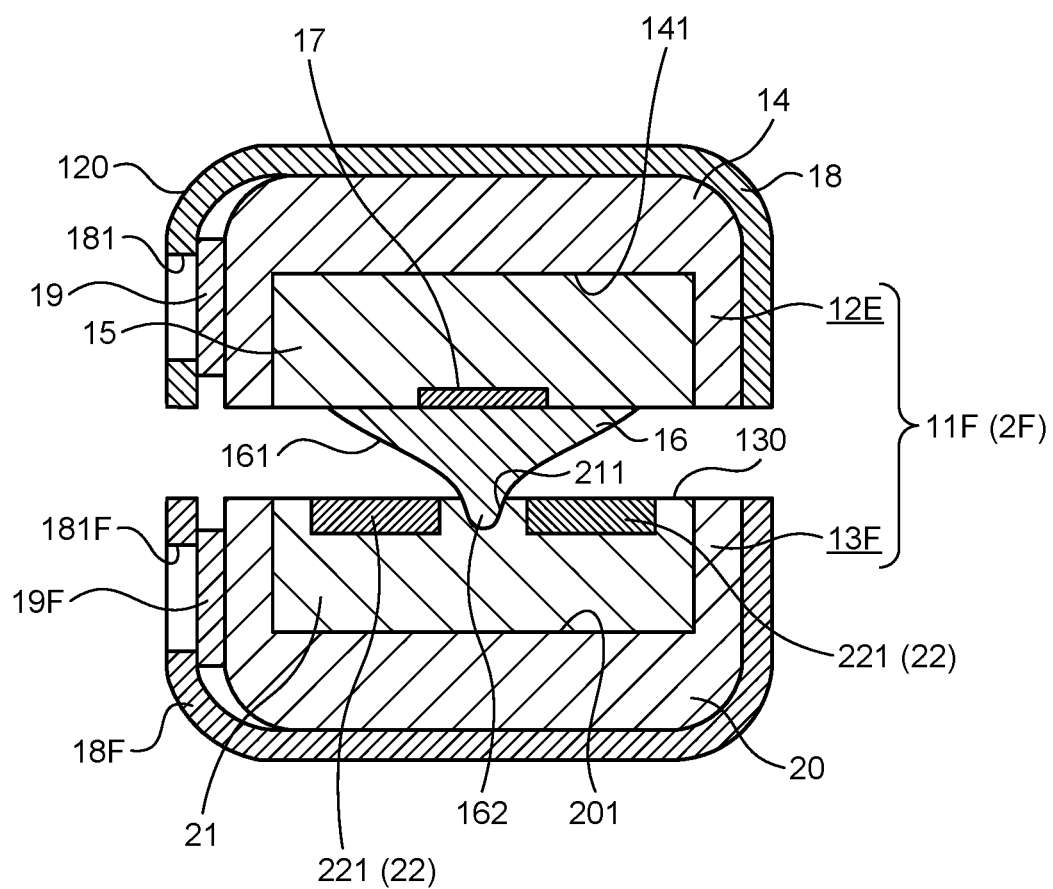
FIG. 12 is a diagram illustrating a sixth modification of the embodiment.

FIG. 12 is a diagram illustrating a sixth modification of the present embodiment. Specifically, FIG. 12 is a cross-section corresponding to FIG. 2.

In the treatment instrument 2 according to the embodiment described above, a first energy generating unit according to the disclosure is constituted of the bipolar electrode 16 that flows a high frequency current to a portion between itself and the return electrode 4, but it is not limited thereto, and two units of the first energy generating units according to the disclosure may be provided, and it may be configured such that the two units of the first energy generating units function as a bipolar electrode.

For example, a grasping part 11F (first and second grasping members 12E, 13F) in a treatment instrument 2F according to the sixth modification illustrated in FIG. 12 differs from the grasping part 11E according to the fifth modification described above in a point in which one unit of the first energy generating unit according to the disclosure is added to the second grasping member 13F.

In the following, for convenience of explanation, the monopolar electrode 19 is denoted as third bipolar electrode 19.

The second grasping member 13F differs from the first grasping member 13 explained in the embodiment described above in a point in which a cover 18F and a fourth bipolar electrode 19F are added as illustrated in FIG. 12.

The cover 18F is a member that covers surfaces (side surface on the distal end side Ar1, side surface on the proximal end side Ar2, respective side on both sides in a width direction (left and right direction in FIG. 12), and rear surface (surface on an upper side in FIG. 12)) other than a surface on a side closer to the first grasping member 12E in the second jaw 20. That is, the cover 18F is arranged on the surfaces (side surface on the distal end side Ar1, side surface on the proximal end side Ar2, respective side on both sides in a width direction (left and right direction in FIG. 12), and rear surface (surface on an upper side in FIG. 12)) other than the surface on the side closer to the first grasping member 12E in the second grasping member 13F. In the following, for convenience of explanation, in the second grasping member 13F, the surfaces other than the surface on the side closer to the first grasping member 12E are denoted as non-grasping surface 131 (FIG. 12), This cover 18F is constituted of an insulating material having a low thermal conductivity, such as PEEK. That is, by arranging the cover 18F, even when the non-grasping surface 131 contacts a non-target portion other than a target portion that is a subject to be treated in the living tissue, the non-target portion and the second jaw 20 are electrically insulated, and temperature increase of the non-grasping surface 131 is suppressed and, therefore, an unintended influence on the non-target portion is suppressed.

On one side in a width direction (left and right direction in FIG. 12) of the cover 18F, an opening portion 181F (FIG. 12) that pierces through the cover 18F in a thickness direction is arranged.

The fourth bipolar electrode 19F is a portion that generates a high frequency energy under control of the control device 3, and corresponds to the second energy generating unit according to the disclosure. This fourth bipolar electrode 19F is constituted of, for example, a conductive material, such as copper. The fourth bipolar electrode 19F is attached to a rear surface of the cover 18F in an electrically insulated state with respect to the second jaw 20. In this state, the fourth bipolar electrode 19F is exposed to the outside of the second grasping member 13F through the opening portion 181F as illustrated in FIG. 12.

In the fourth bipolar electrode 19F, to the surface (surface on the left side in FIG. 12) exposed to the outside of the second grasping member 13F through the opening portion 181F, a coating agent having non-viscosity to a living body is applied, although specific illustration is omitted.

Moreover, the fourth bipolar electrode 19F is electrically connected to the control device 3 through a fifth supply path (not illustrated) including the first electric cable C1. To a portion between the third and fourth bipolar electrodes 19 and 19F, the first high frequency power is supplied through the first supply path PA1 and the fifth supply path (not illustrated) under control of the control device 3, according to the first treatment start operation made with respect to the second switch 8 by the operator. Thus, through a living tissue positioned between the third and fourth bipolar electrodes 19 and 19F, a high frequency current flows. In other words, to the living tissue, a high frequency energy is applied.

Also when the sixth modification explained above is adopted, a similar effect as the fifth modification of the embodiment described above is obtained.

The sixth modification may be adopted to the configuration of the first modification in which a living tissue is mechanically incised described above. Moreover, the third and fourth bipolar electrodes 19 and 19F may be provided only in one of the first and the second grasping members 12E, 13F.

Seventh Modification

Figure 13:
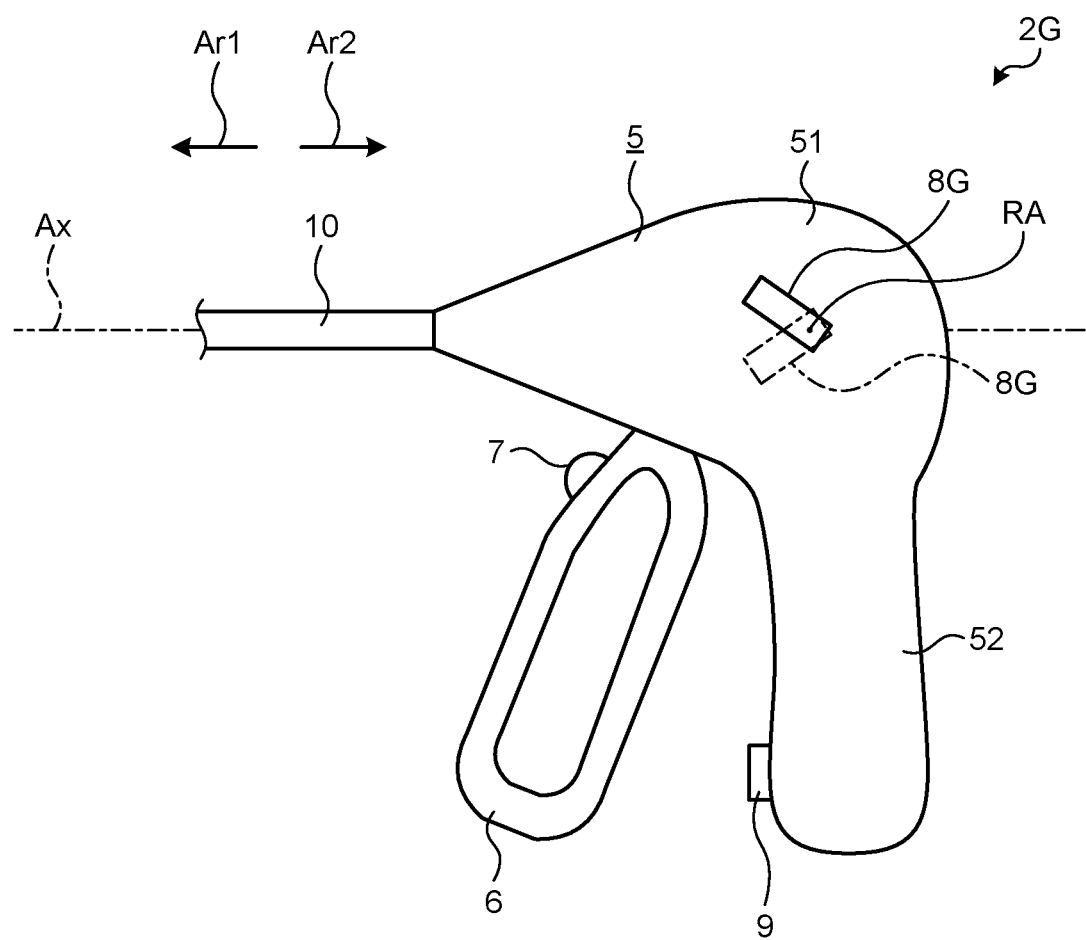
FIG. 13 is a diagram illustrating a seventh modification of the embodiment.

FIG. 13 is a diagram illustrating a seventh modification of the present embodiment. Specifically, FIG. 13 is a side view of a portion at the proximal end side Ar2 of a treatment instrument 2G according to the seventh modification viewed from the direction perpendicular to the center axis Ax.

The treatment instrument 2G according to the seventh modification differs from the treatment instrument 2 explained in the embodiment described above in a point in which an output switching lever 8G is adopted instead of the second switch 8 as illustrated in FIG. 13.

The output switching lever 8G is arranged in a state exposing to the outside from a side surface of the holding case main body 51, and is rotatable relative to a rotation axis RA as illustrated in FIG. 13. In the seventh modification, the output switching lever 8G is configure to be switchable between two positions of a first state in which an end portion on the distal end side Ar1 is positioned at an upper side in FIG. 13 (state indicated by a solid line in FIG. 13), and a second state in which it is positioned on a lower side in FIG. 13 (state indicated by a dot-and-dash line in FIG. 13).

The control device 3 supplies the first high frequency power to the portion between the monopolar electrode 19 and the return electrode 4 when a second processing start operation is made with respect to the third switch 9 by an operator in a state in which the output switching lever 8G is switched to the first state. On the other hand, the control device 3 supplies the second high frequency power to the portion between the first and the second bipolar electrodes 16 and 22 when the second processing start operation is made with respect to the third switch 9 by the operator in a state in which the output switching lever is switched to the second state.

Also when the seventh modification explained above is adopted, a similar effect as the embodiment described above is obtained.

The configuration of the seventh modification may be adopted to the configuration of the first modification in which a living tissue is mechanically incised described above.

Eighth Modification

Figure 14:
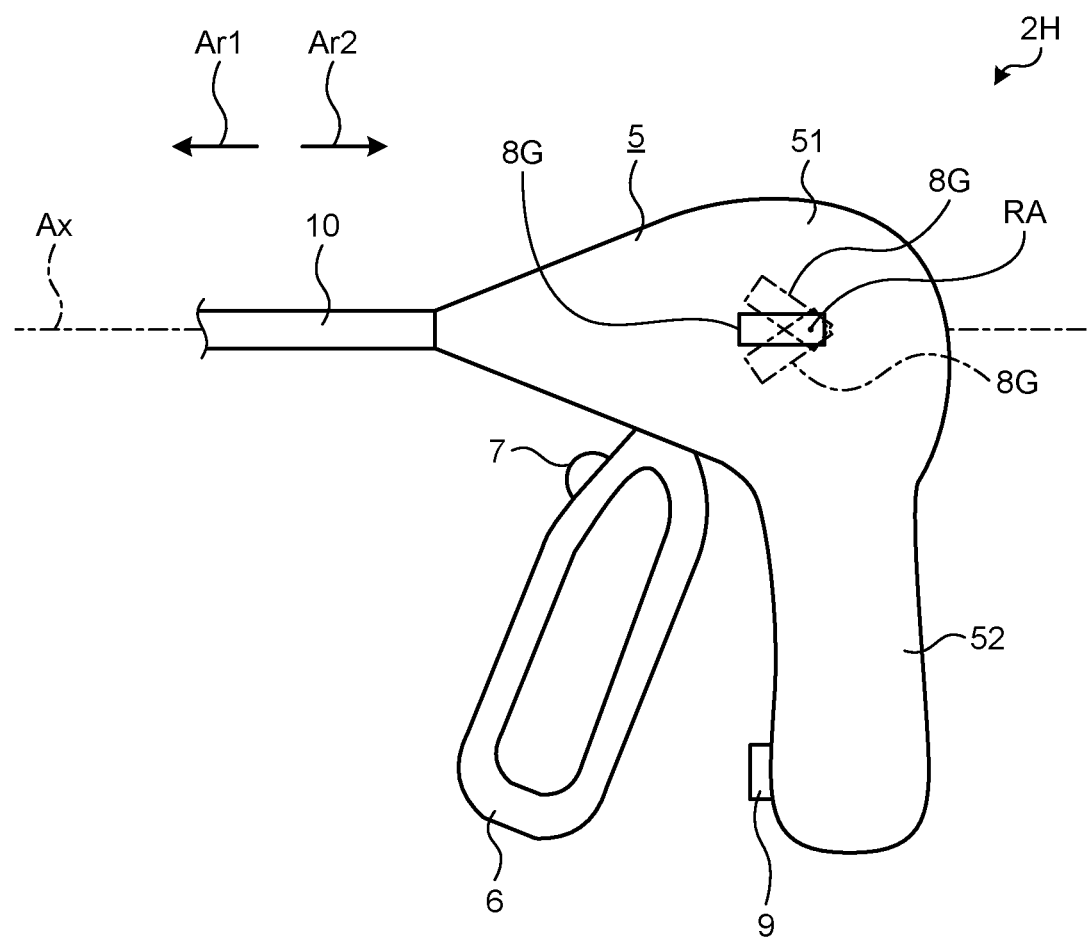
FIG. 14 is a diagram illustrating an eighth modification of the embodiment.

FIG. 14 is a diagram illustrating an eighth modification of the present embodiment. Specifically, FIG. 14 is a side view of a portion at the proximal end side Ar2 of a treatment instrument 2H according to the eighth modification viewed from the direction perpendicular to the center axis Ax.

The treatment instrument 2H according to the eighth modification differs from the treatment instrument 2G explained in the seventh modification described above in a point in which the output switching lever 8G is configured to be switchable among three positions.

Specifically, as illustrated in FIG. 14, the output switching lever 8G is switchable among three positions of the first state in which the end portion on the distal end side Ar1 is positioned at an upper side in FIG. 14 (state indicated by a dot-and-dash line in FIG. 14), a second state in which it is positioned on a lower side in FIG. 14 (state indicated by a dot-and-dash line in FIG. 14), and a third state in which it is positioned between the first state and the second state (state indicated by a solid line in FIG. 14).

The control device 3 supplies the first high frequency power to the portion between the monopolar electrode 19 and the return electrode 4 when the second processing start operation is made with respect to the third switch 9 by an operator in a state in which the output switching lever 8G is switched to the first state. On the other hand, the control device 3 supplies the second high frequency power to the portion between the first and the second bipolar electrodes 16 and 22 when the second processing start operation is made with respect to the third switch 9 by the operator in a state in which the output switching lever 8G is switched to the second state. The control device 3 does not perform either supply of the first high frequency power to the portion between the monopolar electrode 19 and the return electrode 4 and supply of the second high frequency power to the portion between the first and the second bipolar electrodes 16 and 22 even when the second processing start operation is made with respect to the third switch 9 by the operator, in a state in which the output switching lever 8G is switched to the third state.

Also when the eighth modification explained above is adopted, a similar effect as the seventh modification of the embodiment described above is obtained.

Moreover, because only grasp of a living tissue can be performed by the closing operation to the operating knob 6 without supplying the first and the second high frequency powers, convenience can be improved.

The configuration of the eighth modification may be adopted to the configuration of the first modification in which a living tissue is mechanically incised.

Ninth Modification

Figure 15:
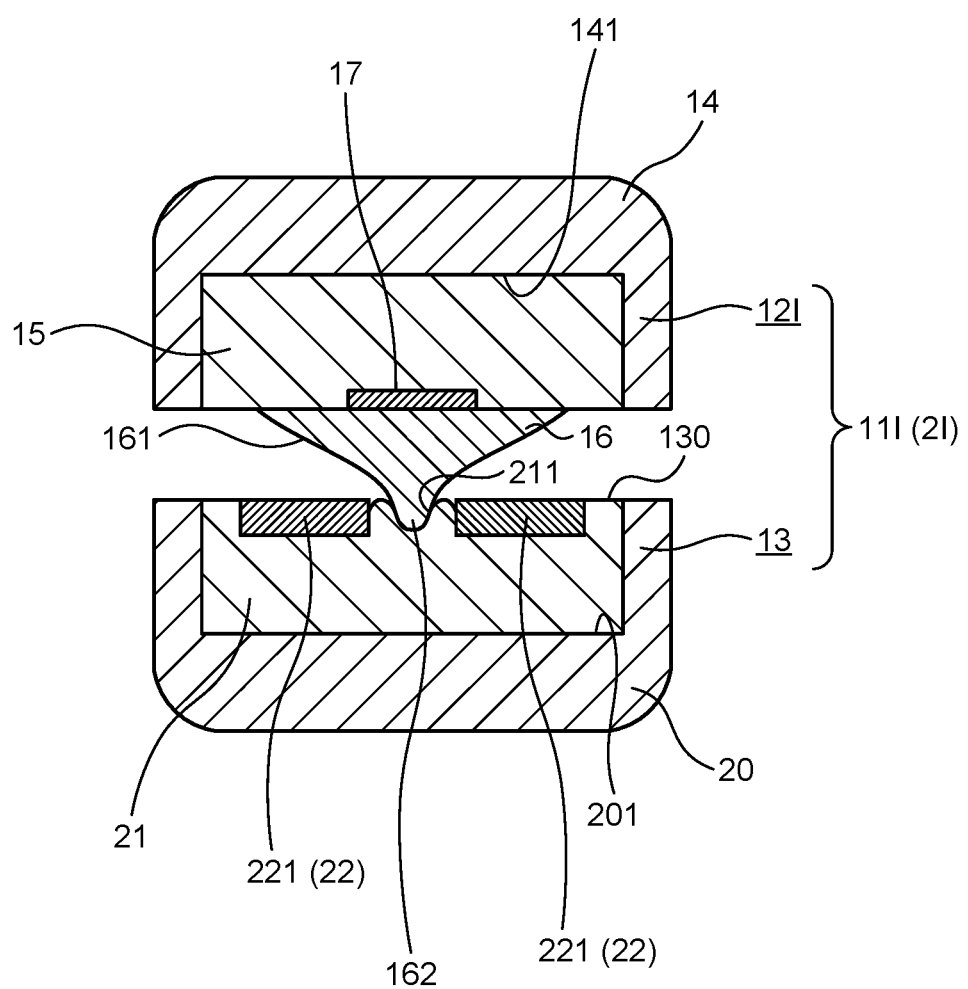
FIG. 15 is a diagram illustrating a ninth modification of the embodiment.
Figure 16:
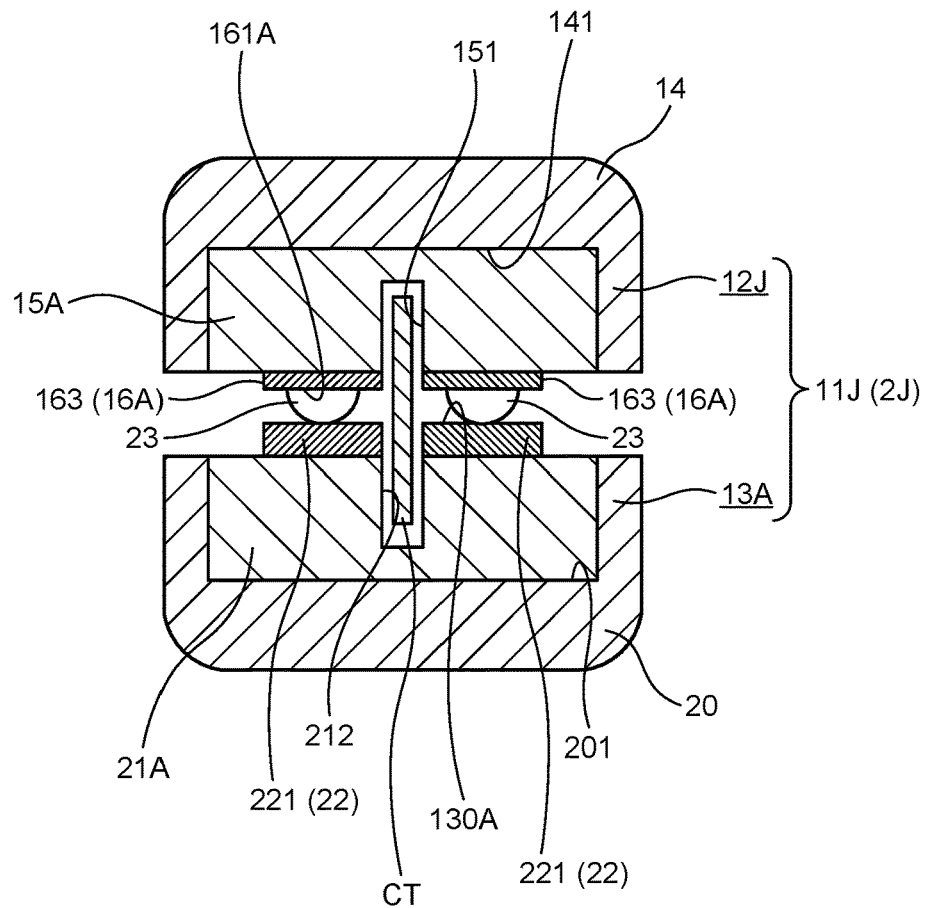
FIG. 16 is a diagram illustrating the ninth modification of the embodiment.

FIG. 15 and FIG. 16 are diagrams illustrating a ninth modification of the present embodiment. Specifically, FIG. 15 and FIG. 16 are cross-sections corresponding to FIG. 2.

A grasping part 11I (first and second grasping members 12I, 13) in a treatment instrument 2I according to the ninth modification differs from the grasping part 11 explained in the embodiment described above in a point in which the cover 18 and the monopolar electrode 19 are omitted as illustrated in FIG. 15.

Similarly, a grasping part 11J (first and second grasping members 12J, 13A) in a treatment instrument 2J according to the ninth modification differs from the grasping part 11A explained in the first modification described above in a point in which the cover 18 and the monopolar electrode 19 are omitted as illustrated in FIG. 16.

When the output switching lever 8G explained in the seventh modification described above is adopted to the treatment instrument 2I according to the ninth modification, the control device 3 operates as follows.

The control device 3 supplies the second high frequency power to the portion between the first and the second bipolar electrodes 16 and 22 (or the first and the second bipolar electrodes 16A and 22) when the second processing start operation is made with respect to the third switch 9 by an operator in a state in which the output switching lever 8G is switched to the second state. On the other hand, the control device 3 does not perform supply of the second high frequency power to the portion between the first and the second bipolar electrodes 16 and (or the first and the second bipolar electrode 16A and 22) even when the second processing start operation is made with respect to the third switch 9 by the operator, in a state in which the output switching lever 8G is switched to the first state.

Tenth Modification

Figure 17:
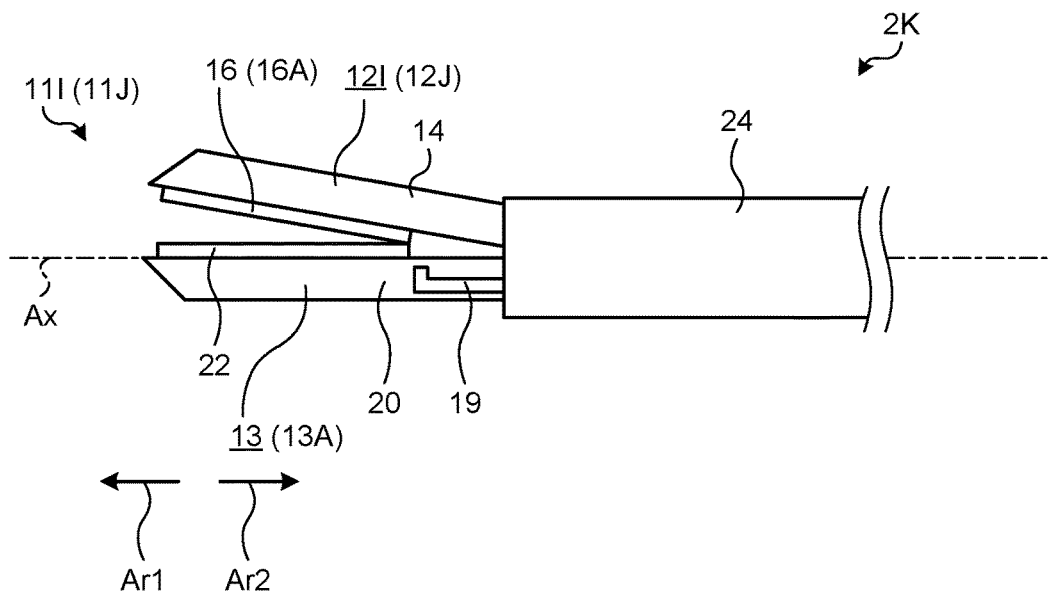
FIG. 17 is a diagram illustrating a tenth modification of the embodiment.
Figure 18:
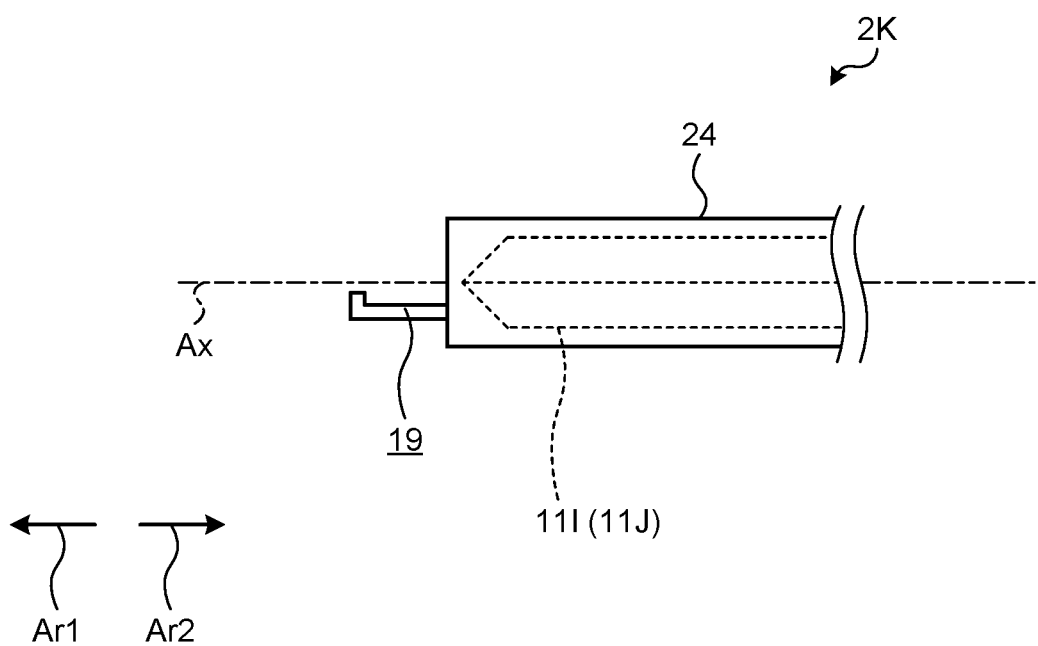
FIG. 18 is a diagram illustrating the tenth modification of the embodiment.

FIG. 17 and FIG. 18 are diagrams illustrating a tenth modification of the present embodiment. Specifically, FIG.

17 and FIG. 18 are side views of a portion at the distal end side Ar1 of a treatment instrument 2K according to the tenth modification viewed from the direction perpendicular to the center axis Ax.

The treatment instrument 2K according to the tenth modification differs from the treatment instrument 2 explained in the embodiment described above in a point in which an arrangement position of the monopolar electrode 19 is different, and an outer sheath 24 is added as illustrated in FIG. 17 or FIG. 18.

The outer sheath 24 has a cylindrical shape in which the shaft 10 is inserted therein.

The monopolar electrode 19 is fixed to an end portion on the distal end side Ar1 in the outer sheath 24, and has a hook shape (L-shape) protruding toward the distal end side Ar1 from the outer sheath 24. That is, to the treatment instrument 2K according to the tenth modification, the grasping part 11I (or the grasping part 11J) explained in the ninth modification described above is adopted.

When the output switching lever 8G explained in the seventh modification is adopted to the treatment instrument 2K according to the tenth modification, the outer sheath 24 and the control device 3 operate as follows.

The outer sheath 24 moves to the distal end side Ar1 relative to the shaft 10 as illustrated in FIG. 18 when the output switching lever 8G is switched from the second state to the first state. Thus, the grasping part 11I (or the grasping part 11J) is configured to be in the closed state, and is inserted inside the outer sheath 24. The control device 3 supplies the first high frequency power to the portion between the monopolar electrode 19 and the return electrode 4 when the second processing start operation is made with respect to the third switch 9 by an operator in the state in which the output switching lever 8G is switched to the first state.

On the other hand, the outer sheath 24 moves to the proximal end side Ar2 relative to the shaft 10 as illustrated in FIG. 17 when the output switching lever 8G is switched from the first state to the second state. Thus, the grasping part 11I (or the grasping part 11J) is exposed to the outside of the outer sheath 24. The control device 3 supplies the second high frequency power to the portion between the first and the second bipolar electrodes 16 and (or the first and the second bipolar electrodes 16A and 22) when the second processing start operation is made with respect to the third switch 9 by an operator in a state in which the output switching lever 8G is switched to the second state.

Eleventh Modification

Figure 19:
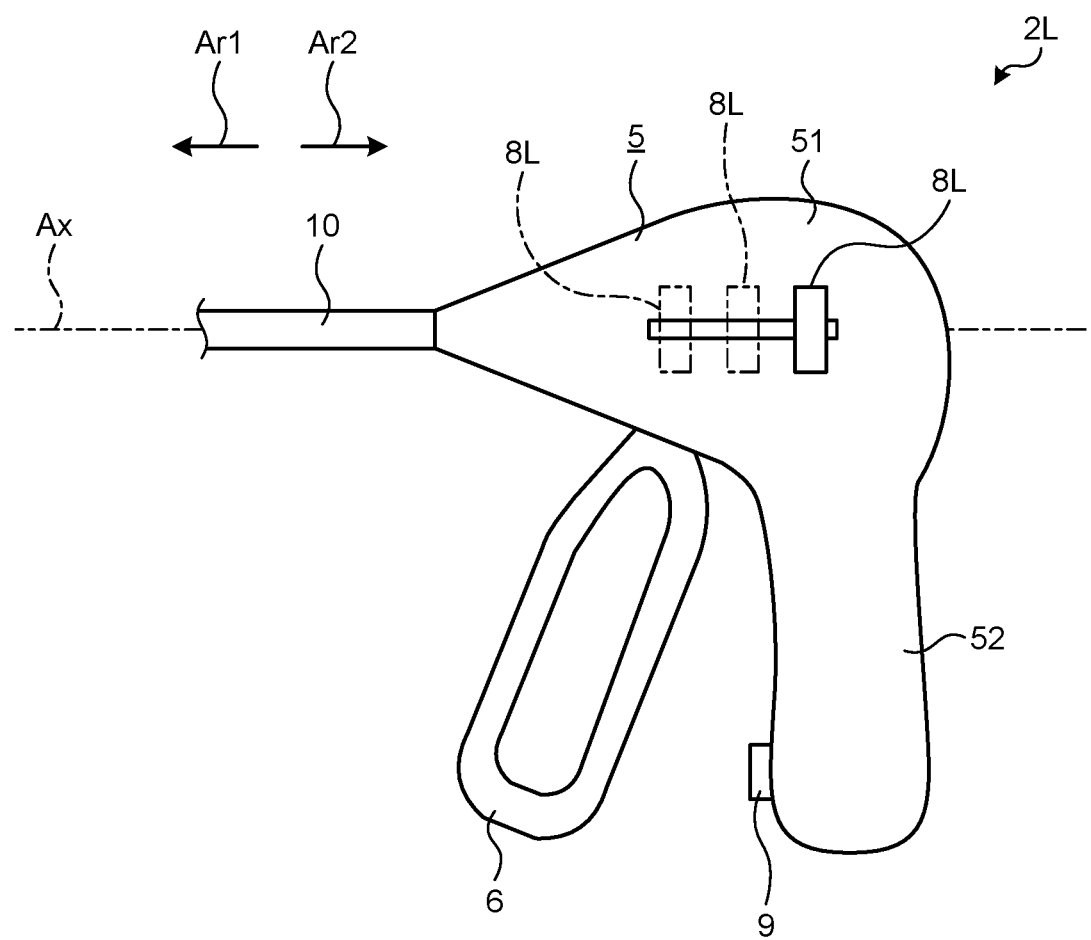
FIG. 19 is a diagram illustrating an eleventh modification of the embodiment.

FIG. 19 is a diagram illustrating an eleventh modification of the present embodiment. Specifically, FIG. 19 is a side view of a portion at the proximal end side Ar2 of a treatment instrument 2L according to the eleventh modification viewed from the direction perpendicular to the center axis Ax.

The treatment instrument 2L according to the eleventh modification differs from the treatment instrument 2 explained in the embodiment described above in a point in which the first switch 7 is omitted, and a slide switch 8L is adopted in place of the second switch 8 as illustrated in FIG. 19. Although specific illustration is omitted, in the treatment instrument 2L, the grasping part 11I explained in the ninth modification described above is adopted instead of the grasping part 11 explained in the embodiment described above.

The slide switch 8L is arranged in a state of being exposed to the outside from a side surface of the holding case main body 51 as illustrated in FIG. 19, and is movable on a straight line parallel to the center axis Ax. In the eleventh modification, the slide switch 8L is switchable among three positions of a first state in which it is positioned at the most distal end side Ar1 (state indicated by a dot-and-dash line in FIG. 19), a second state in which it is positioned at the most proximal end side Ar2 (state indicated by a solid line in FIG. 19), and a third state in which it is positioned between the first state and the second state (state indicated by a dot-and-dash line in FIG. 19).

The control device 3 supplies power to the heater 17 (electric resistance pattern) when the second processing start operation is made with respect to the third switch 9 by an operator in a state in which the slide switch 8L is switched to the third state. On the other hand, the control device 3 supplies the second high frequency power to the portion between the first and the second bipolar electrodes 16 and 22 when the second processing start operation is made with respect to the third switch 9 by an operator in the state in which the slide switch 8L is switched to the second state. The control device 3 does not perform either supply of power to the heater 17 nor supply of the second high frequency power to the portion between the first and the second bipolar electrodes 16 and 22 even when the second processing start operation is made with respect to the third switch 9 by the operator, in a state in which the slide switch 8L is switched to the first state.

If the slide switch 8L is a switch configured to be switchable between two positions of ON/OFF of output, the grasping part 11J explained in the ninth modification described above may be adopted.

Twelfth Modification

Figure 20:
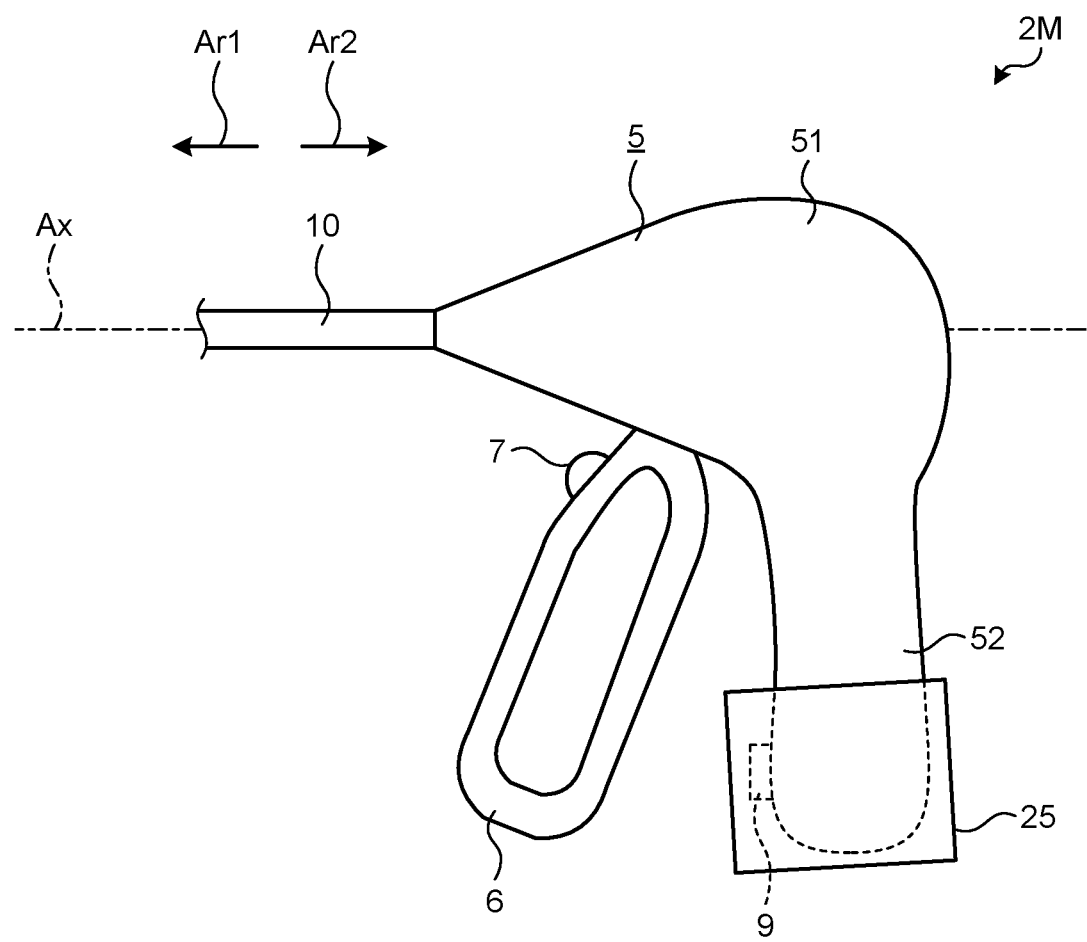
FIG. 20 is a diagram illustrating a twelfth modification of the embodiment.
Figure 21:
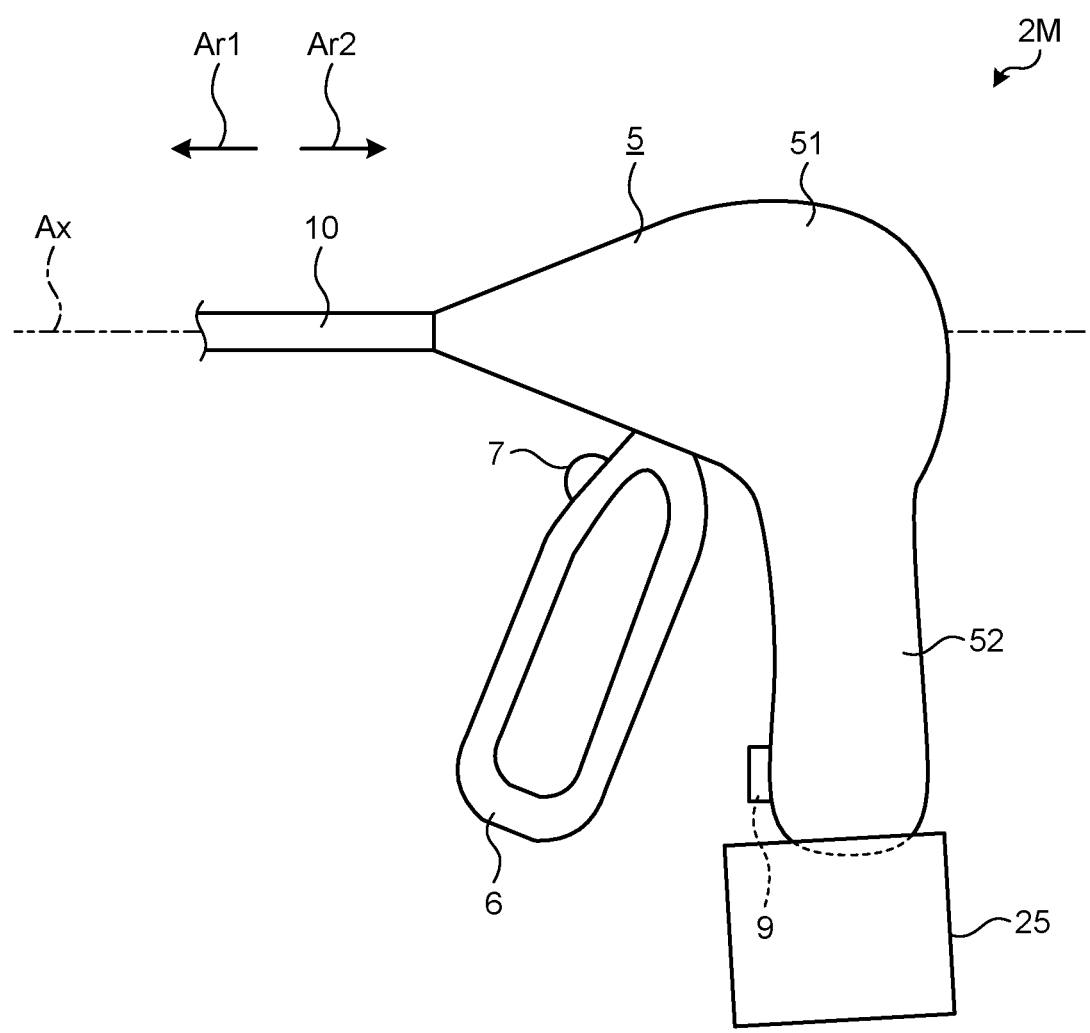
FIG. 21 is a diagram illustrating the twelfth modification of the embodiment.

FIG. 20 and FIG. 21 are diagrams illustrating a twelfth modification of the present embodiment. Specifically, FIG. 20 and FIG. 21 are side views of a portion on the proximal end side Ar2 of a treatment instrument 2M according to the twelfth modification viewed from the direction perpendicular to the center axis Ax.

The treatment instrument 2M according to the twelfth modification differs from the treatment instrument 2 explained in the embodiment described above in a point in which the second switch 8 is omitted and a handle cover 25 is added as illustrated in FIG. 20 and FIG. 21. Although specific illustration is omitted, in the treatment instrument 2M, the grasping part 11I (or the grasping part 11J) explained in the ninth modification described above is adopted instead of the grasping part 11 explained in the embodiment described above.

The handle cover 25 is movably attached on an outer surface of the fixed handle 52 as illustrated in FIG. 20 and FIG. 21. More specifically, the handle cover 25 is movable between a first position (FIG. 20) at which depression of the third switch 9 is inhibited by covering the third switch 9 and a second position (FIG. 21) at which depression of the third switch 9 is allowed by exposing the third switch 9.

That is, in a state in which the handle cover 25 is positioned at the first position, even when the second processing start operation is made with respect to the third switch 9 by an operator, the third switch 9 cannot be depressed because the operating knob 6 abuts on the handle cover 25. A living tissue can be grasped by the grasping part 11I (or the grasping part 11J).

On the other hand, when the handle cover 25 is positioned at the second position, if the second processing start operation is made with respect to the third switch 9 by the operator, the operating knob 6 can depress the third switch 9.

Thirteenth Modification

Figure 22:
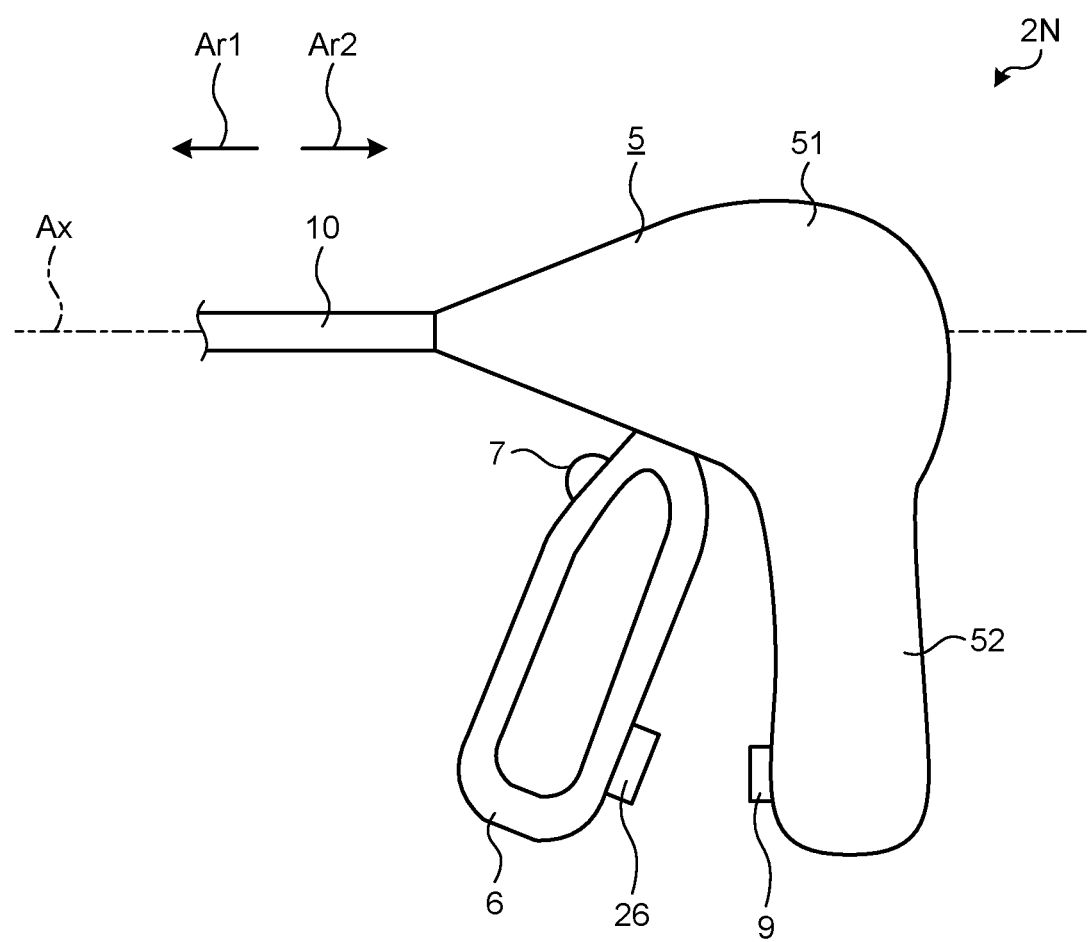
FIG. 22 is a diagram illustrating a thirteenth modification of the embodiment.
Figure 23:
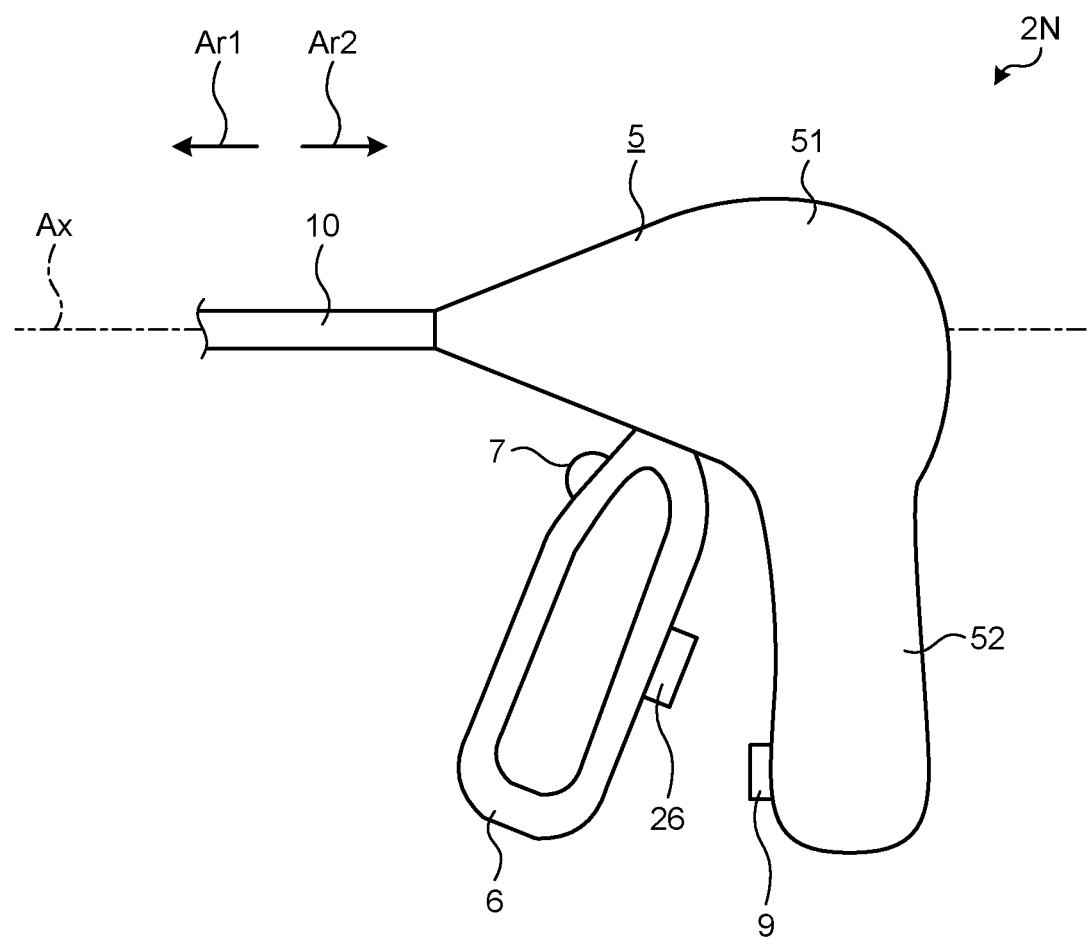
FIG. 23 is a diagram illustrating the thirteenth modification of the embodiment.

FIG. 22 and FIG. 23 are diagrams illustrating a thirteenth modification of the present embodiment. Specifically, FIG. 22 and FIG. 23 are side views of a portion at the proximal end side Ar2 of a treatment instrument 2N according to the thirteenth modification viewed from the direction perpendicular to the center axis Ax.

The treatment instrument 2N according to the thirteenth modification differs from the treatment instrument 2 explained in the embodiment described above in a point in which the second switch 8 is omitted, and a switch protrusion 26 is added as illustrated in FIG. 22 and FIG. 23. Although specific illustration is omitted, in the treatment instrument 2N, the grasping part 11I (or the grasping part 11J) explained in the ninth modification described above is adopted instead of the grasping part 11 explained in the embodiment described above.

The switch protrusion 26 is a protrusion to depress the third switch 9. This switch protrusion 26 is movably attached on a side surface on the proximal end side Ar2 of the operating knob 6 as illustrated in FIG. 22 and FIG. 23. More specifically, the switch protrusion 26 is movable between a second position (FIG. 22) facing the third switch 9 and a first position (FIG. 23) that is shifted from the position facing the third switch 9.

That is, in a state in which the switch protrusion 26 is positioned at the first position, even when the second processing start operation is made with respect to the third switch 9 by an operator, the third switch 9 cannot be depressed because the switch protrusion 26 abuts on the fixed handle 52. The operating knob 6 cannot depress the third switch 9 either because the switch protrusion 26 abuts on the fixed handle 52. A living tissue can be grasped by the grasping part 11I (or the grasping part 11J).

On the other hand, in a state in which the switch protrusion 26 is positioned at the second position, if the second processing start operation is made with respect to the third switch 9 by the operator, the switch protrusion 26 can depress the third switch 9.

Fourteenth Modification

Figure 24:
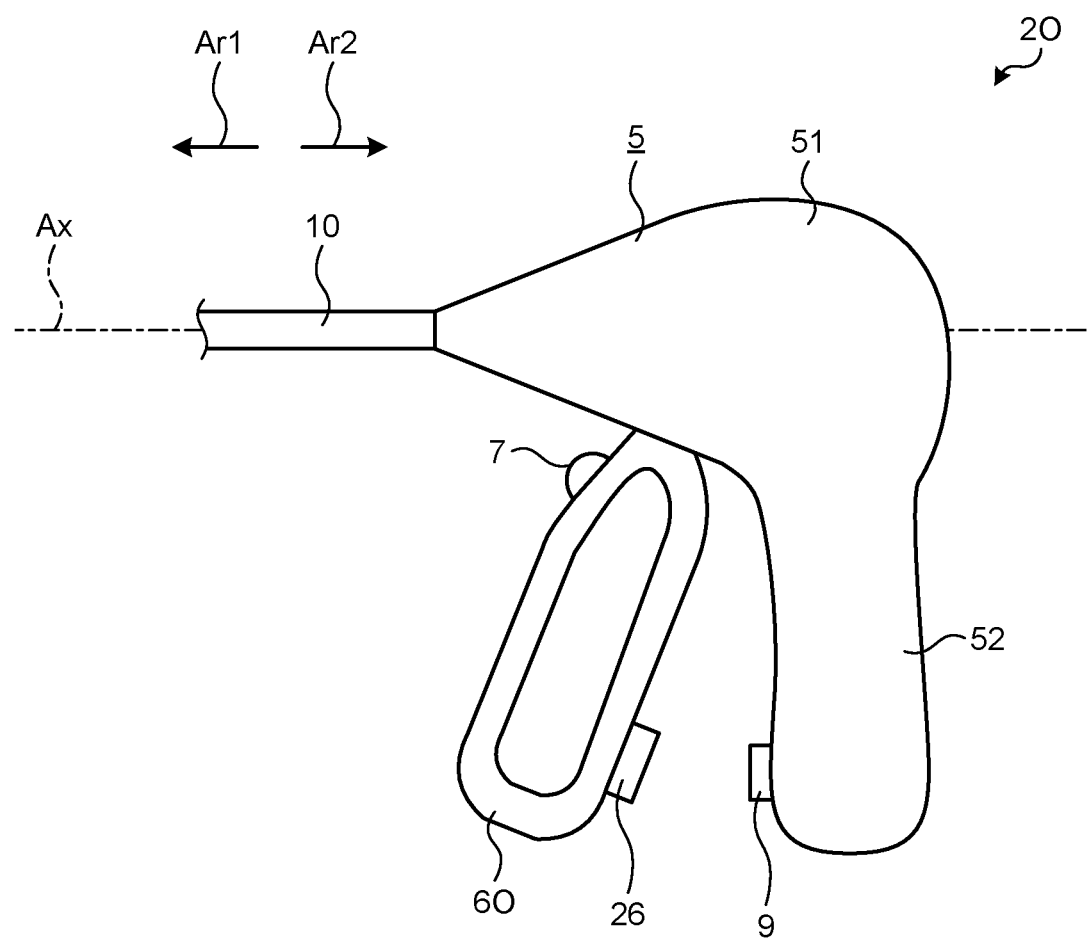
FIG. 24 is a diagram illustrating a fourteenth modification of the embodiment.
Figure 25:
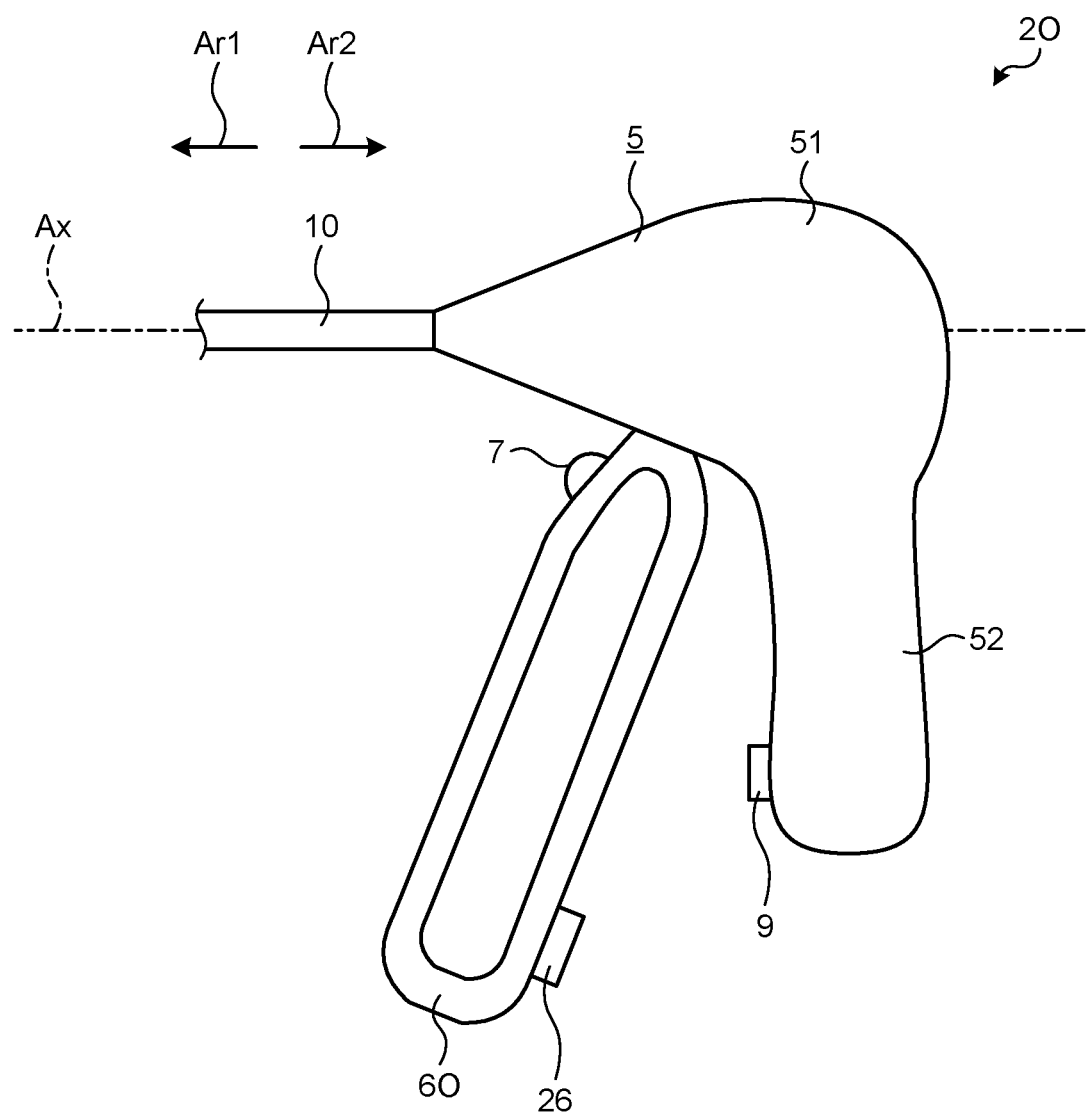
FIG. 25 is a diagram illustrating the fourteenth modification of the embodiment.

FIG. 24 and FIG. 25 are diagrams illustrating a fourteenth modification of the present embodiment. Specifically, FIG. 24 and FIG. 25 are side views of a portion on the proximal end side Ar2 of a treatment instrument 2O according to the fourteenth modification viewed from the direction perpendicular to the center axis Ax.

The treatment instrument 2O according to the fourteenth modification differs from the treatment instrument 2 explained in the embodiment described above in a point in which the second switch 8 is omitted, the switch protrusion 26 is added, and an operating knob 60 is adopted in place of the operating knob 6 as illustrated in FIG. 24 and FIG. 25. Although specific illustration is omitted, in the treatment instrument 2O, the grasping part 11I (or the grasping part 11J) explained in the ninth modification described above is adopted instead of the grasping part 11 explained in the embodiment described above.

The switch protrusion 26 is a protrusion to depress the third switch 9 similarly to the switch protrusion 26 explained in the thirteenth modification described above. In the fourteenth modification, the switch protrusion 26 is fixed to a side surface on the proximal end side Ar2 of the operating knob 60.

The operating knob 60 differs from the operating knob 6 explained in the embodiment described above in a point in which it is configured such that a dimension in the longitudinal direction is variable as illustrated in FIG. 24 and FIG. 25. More specifically, the operating knob 60 is configured to vary the dimension in the longitudinal direction between a second state (FIG. 24) in which the switch protrusion 26 faces the third switch 9 and a first state (FIG. 25) in which the switch protrusion 26 does not face the third switch 9.

That is, when the operating knob 60 is configured to be in the first state, even when the second processing start operation is made with respect to the third switch 9 by an operator, the switch protrusion 26 cannot depress the third switch 9. The operating knob 6 cannot depress the third switch 9 either because a position of a maximum separation from the fixed handle 52 is apart from the third switch 9. A living tissue can be grasped by the grasping part 11I (or the grasping part 11J).

On the other hand, in a state in which the switch protrusion 26 is configured to be in the second state, if the second processing start operation is made with respect to the third switch 9 by the operator, the switch protrusion 26 can depress the third switch 9.

Fifteenth Modification

Figure 26:
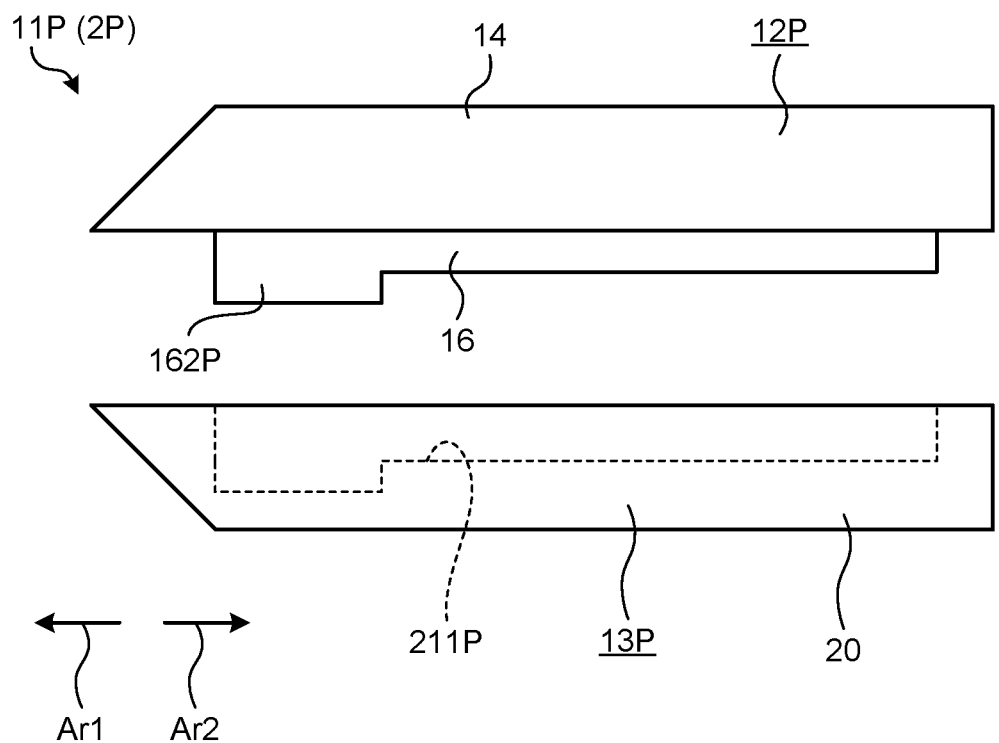
FIG. 26 is a diagram illustrating a fifteenth modification of the embodiment.

FIG. 26 is a diagram illustrating a fifteenth modification of the present embodiment. Specifically, FIG. 26 is a side view of a grasping part 11P of a treatment instrument 2P according to the fifteenth modification viewed from the direction perpendicular to the center axis Ax.

The grasping part 11P (first and second grasping members 12P, 13P) of the treatment instrument 2P according to the fifteenth modification differs from the grasping part 11I according to the ninth modification described above in a point in which the shape of the convex portion 162 and the shape of the groove portion 211 are changed as illustrated in FIG. 26. In the following, the convex portion 162 according to the fifteenth modification is denoted as convex portion 162P (FIG. 26), and the groove portion 211 according to the fifteenth modification is denoted as groove portion 211P (FIG. 26).

In the convex portion 162P, a portion on the distal end side Ar1 protrudes toward the second grasping member 13P relative to a portion on the proximal end side Ar2. On the other hand, because the first and the second grasping members 12P, 13P become substantially parallel to each other when the first and the second grasping members 12P, 13P are in the closed state, the groove portion 211P is formed such that the portion on the distal end side Ar1 is recessed deeper than the portion on the proximal end side Ar2, to match with the shape of the convex portion 162P.

By adopting the convex portion 162P and the groove portion 211P described above, a structure easy to grasp a living tissue with the first and the second grasping members 12P, 13P can be achieved.

Sixteenth Modification

Figure 27:
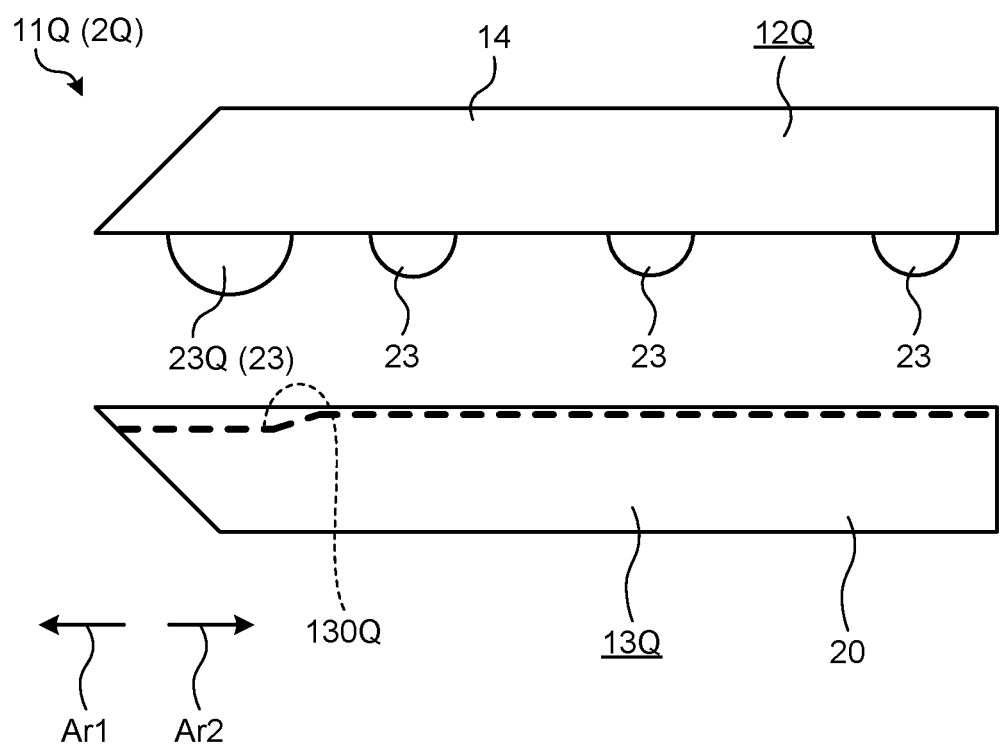
FIG. 27 is a diagram illustrating a sixteenth modification of the embodiment.

FIG. 27 is a diagram illustrating a sixteenth modification of the present embodiment. Specifically, FIG. 27 is a side view of a grasping part 11Q of a treatment instrument 2Q according to the sixteenth modification viewed from the direction perpendicular to the center axis Ax.

The grasping part 11Q of the treatment instrument 2Q according to the sixteenth modification differs from the grasping part 11J according to the ninth modification described above in a point in which the shape of a part of the abutting portion 23 and the shape of the second grasping surface 130A are changed as illustrated in FIG. 27. In the following, the part of the abutting portion 23 according to the sixteenth modification is denoted as abutting portion 23Q (FIG. 27), and the second grasping surface 130A according to the sixteenth modification is denoted as grasping surface 130Q (FIG. 27).

The abutting portion 23Q is positioned on the most distal end side Ar1 in the entire abutting portion 23 as illustrated in FIG. 27. Moreover, the abutting portion 23Q protrudes toward the second grasping member 13Q relative to the other abutting portion 23. On the other hand, because the second grasping surface 130Q and the first grasping surface 161A become substantially parallel when the first and the second grasping members 12Q, 13Q are in the closed state, the second grasping surface 130Q is formed such that the portion on the distal end side Ar1 is recessed deeper than the portion on the proximal end side Ar2, to match with a peek position of the abutting portion 23 including the abutting portion 23Q.

By adopting the abutting portion 23Q and the second grasping surface 130Q described above, a structure easy to grasp a living tissue by the first and the second grasping members 12Q, 13Q is achieved.

Seventeenth Modification

Figure 28:
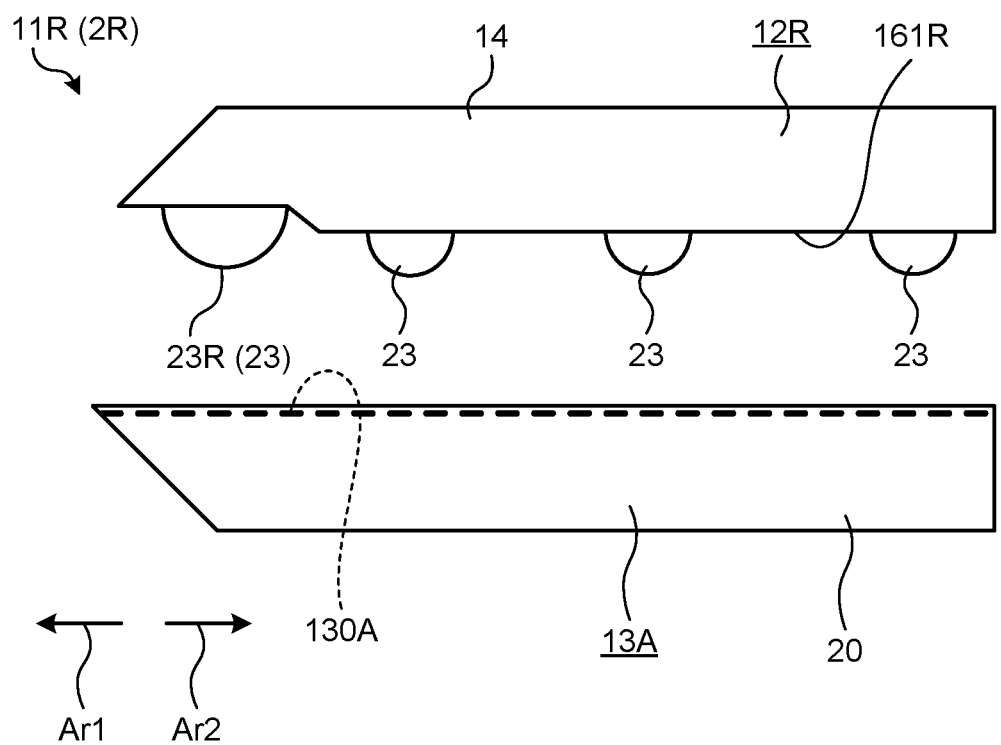
FIG. 28 is a diagram illustrating a seventeenth modification of the embodiment.

FIG. 28 is a diagram illustrating a seventeenth modification of the present embodiment. Specifically, FIG. 28 is a side view of a grasping part 11R of a treatment instrument 2R according to the seventeenth modification viewed from the direction perpendicular to the center axis Ax.

The grasping part 11R (first and second grasping members 12R, 13A) of the treatment instrument 2R according to the seventeenth modification differs from the grasping part 11J according to the ninth modification described above in a point in which the shape of a part of the abutting portion 23 and the shape of the first grasping surface 161A are changed as illustrated in FIG. 28. In the following, the part of the abutting portion 23 according to the seventeenth modification is denoted as abutting portion 23R (FIG. 28), and the first grasping surface 161A according to the seventeenth modification is denoted as first grasping surface 161R (FIG. 28).

The abutting portion 23R is positioned at the most distal end side Ar1 in the entire abutting portion 23 as illustrated in FIG. 28. Moreover, the abutting portion 23R has the largest diameter in the entire abutting portion 23. On the other hand, to make the first grasping surface 16R and the second grasping surface 130A substantially parallel to each other when the first and the second grasping members 12R, 13A are in the closed state, the first grasping surface 161R is formed such that the portion including the abutting portion 23R is offset to a side apart from the second grasping surface 130A relative to the other portion.

By adopting the abutting portion 23R and the first grasping surface 161R described above, a structure easy to grasp a living tissue with the first and the second grasping members 12R, 13R is achieved.

Eighteenth Modification

Figure 29:
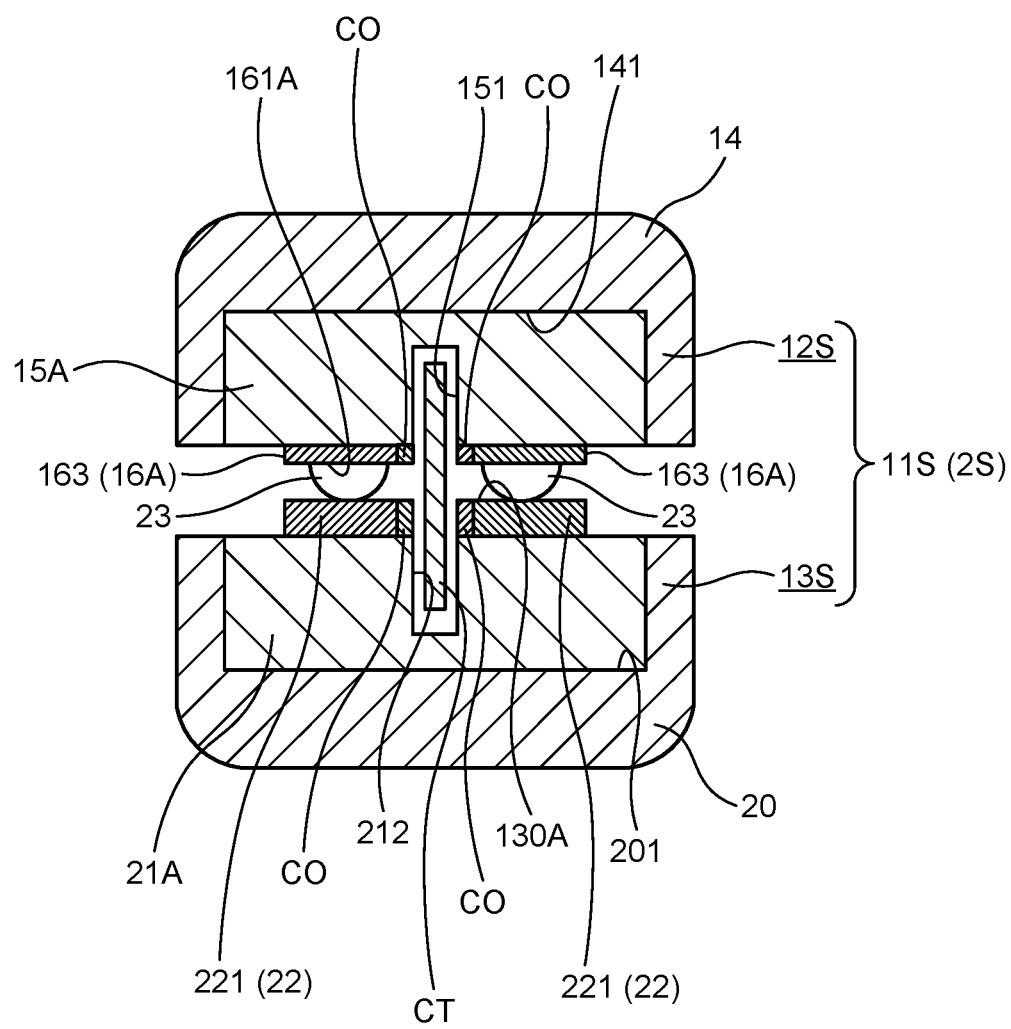
FIG. 29 is a diagram illustrating a eighteenth modification of the embodiment.

FIG. 29 is a diagram illustrating an eighteenth modification of the present embodiment. Specifically, FIG. 29 is a cross-section corresponding to FIG. 2.

The grasping part 11S (first and second grasping members 12S, 13S) of a treatment instrument 2S according to the eighteenth modification differs from the grasping part 11J according to the ninth modification described above in a point in which a coating agent CO is applied to an inner ridge of the U-shaped in the first and the second bipolar electrodes 16A, 22 as illustrated in FIG. 29.

Examples of the coating agent CO include materials having high hardness and low friction, such as ceramic coating (nitride or carbide such as titanium, chrome, aluminum, and silicon) and a diamond-like carbon (DLC).

By adopting the coating agent CO described above, it is possible to suppress damages of the U-shaped inner ridge of the first and the second bipolar electrodes 16A, 33 by the cutter CT, and to allow the cutter CT to make smooth forward and backward movement.

Nineteenth Modification

Figure 30:
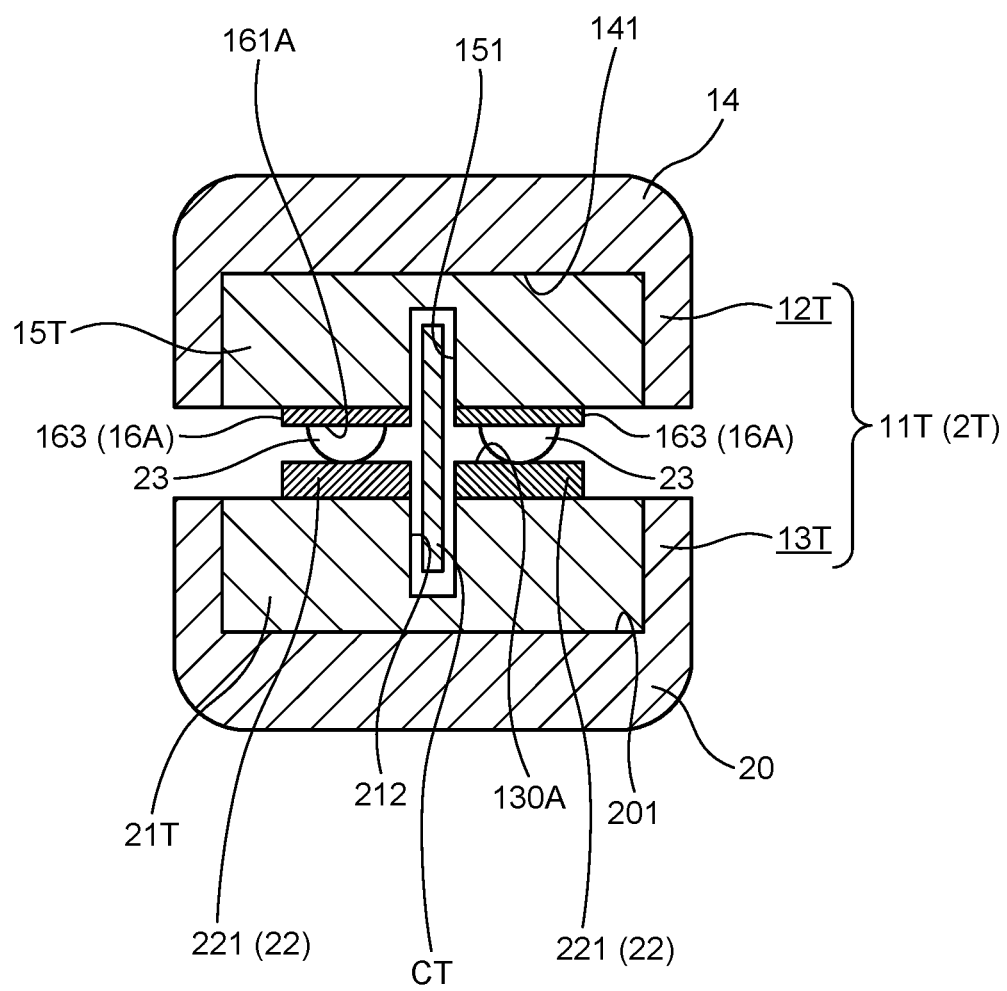
FIG. 30 is a diagram illustrating a nineteenth modification of the embodiment.

FIG. 30 is a diagram illustrating a nineteenth modification of the present embodiment. Specifically, FIG. 30 is a cross-section corresponding to FIG. 2.

A grasping part 11T (first and second grasping members 12T, 13T) of a treatment instrument 2T according to the nineteenth modification differs from the grasping part 11J according to the ninth modification described above in a point in which a material of the first and the second supporting members 15A, 21A is changed as illustrated in FIG. 30. In the following, the first and the second supporting members 15A, 21A according to the nineteenth modification are denoted as first and second supporting members 15T, 21T (FIG. 30).

The first and the second supporting members 15T, 21T are constituted of a material having high hardness and low friction, such as ceramic.

By adopting the first and second supporting members 15T, 21T described above, it is possible to suppress damages the cutter groove portions 151, 212 by the cutter CT, and to allow the cutter CT to make smooth forward and backward movement in the cutter groove portions 151, 212.

Twentieth Modification

In the embodiment and the first to the nineteenth modifications described above, the monopolar electrode 19 and the fourth bipolar electrode 19F are attached to the covers 18, 18C, 18F, but it is not limited thereto. For example, a configuration in which the first grasping members 12, 12A to 12F, 12I, 12J, 12P to 12T, and the second grasping members 13, 13A, 13F, 13P, 13Q, 13S, and 13T are constituted of a carbon graphite that includes a conductive portion in a part, and has a portion having an electric insulation property in other parts, and in which the portion having conductivity constitutes the monopolar electrode 19, the fourth bipolar electrode 19F, the first bipolar electrodes 16, 16A, and the second bipolar electrode 22 may be adopted.

By adopting carbon graphite as described, the grasping parts 11, 11A to 11F, 11I, 11J, 11P to 11T can be made thin, and the application of coating agent having non-viscosity to a living body to the monopolar electrode 19, the fourth bipolar electrode 19F, the first bipolar electrodes 16, 16A, and the second bipolar electrode 22 becomes unnecessary.

Twenty-First Modification

In the embodiment and the first to the ninth modifications described above, a high frequency energy is exemplified as a treatment energy to be applied to a living tissue from the monopolar electrode 19 and the fourth bipolar electrode 19F, but it is not limited thereto, and energies other than the high frequency energy (for example, heat energy) may be adopted.

According to the treatment instrument according to the disclosure, convenience can be improved.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A treatment instrument comprising:
   a first grasping member having a first grasping surface and a second grasping member having a second grasping surface, the first and second grasping surfaces are configured to grasp a living tissue;
a cover configured to cover at least a part of a region of at least one of the first and second grasping members other than the first and second grasping surfaces of the first and second grasping members;
a pair of electrodes respectively arranged on at least one of the first and second grasping surfaces, the pair of electrodes being configured to function as a bipolar electrode;
an opening provided in the cover; and
a monopolar electrode arranged to overlap with the opening and exposed to an outside of the treatment instrument through the opening, the monopolar electrode is positioned between a peripheral surface of the first grasping member and an inner surface of the cover facing the peripheral surface of the grasping member such that the monopolar electrode does not protrude from the cover.

2. The treatment instrument according to claim 1, wherein the opening is arranged on an opposite side to the first and second grasping surfaces.

3. The treatment instrument according to claim 1, wherein the opening is arranged at a distal end side of the first and second grasping members.

4. The treatment instrument according to claim 1, wherein the opening is arranged on a side surface in a width direction of the first and second grasping members.

5. The treatment instrument according to claim 1, further comprising:
a heater provided in at least one of the first and second grasping members.

6. The treatment instrument according to claim 1, further comprising
a cutter configured to move along a longitudinal direction of the first and second grasping members.

7. The treatment instrument according to claim 1, further comprising
an output switching lever configured to switch supply of a high frequency current between the bipolar electrode and the monopolar electrode.

8. The treatment instrument according to claim 7, wherein the output switching lever is configured to switch to a mode in which the high frequency current is not output.

9. The treatment instrument according to claim 1, further comprising:
a plurality of abutting portions provided on at least one of the first and second grasping surfaces, wherein a first abutting portion of the plurality of abutting portions that is arranged at a most distal end relative to a remainder of the plurality of abutting portions, and the first abutting portion of the plurality of abutting portions has a different in size from the remainder of the plurality of abutting portions.

10. The treatment instrument according to claim 1, wherein
the monopolar electrode is arranged at a position offset by an amount equal to a thickness of the cover towards an inside of the treatment instrument from an outer surface of the cover.

11. The treatment instrument according to claim 1, wherein
the cover includes a protrusion between the bipolar electrode and the monopolar electrode.

12. The treatment instrument according to claim 1, further comprising:
a fixed handle;
an operating knob configured to move towards and away from the fixed handle; and
a switch arranged at the fixed handle, the switch being configured to be depressed by an operation of the operating knob.

13. The treatment instrument according to claim 12, wherein
the fixed handle includes a handle cover that is movable between a first position at which depression of the switch is inhibited and a second position at which depression of the switch is allowed.

14. The treatment instrument according to claim 12, wherein
the operating knob includes a protrusion that is movable between a first position shifted from a position facing the switch and a second position facing the switch.

15. The treatment instrument according to claim 1, wherein:
a plurality of abutting portions are arranged on at least one of the first and second grasping surfaces; and
a size of a first abutting portion of the plurality of abutting portions that is located on a distal end side and a size of a second abutting portion of the plurality of abutting portions that is located on a proximal end side are different from each other.

16. The treatment instrument according to claim 1, wherein the cover is arranged to cover front and rear surfaces of the first grasping member from a distalmost end to a proximal end and side surfaces of the first grasping member.

17. The treatment instrument according to claim 1, wherein:
the pair of electrodes includes a first electrode and a second electrode,
the first electrode is disposed on the first grasping surface,
the first electrode has a protrusion that projects toward the second grasping surface,
the second electrode includes two electrodes disposed on the second grasping surface and arranged side by side in a width direction, and
the protrusion is positioned between the two electrodes of the second electrode in the width direction.

18. A treatment instrument comprising:
a sheath having a distal end and a proximal end;
a monopolar electrode exposed to an outside of the treatment instrument when the sheath moves to a proximal end side;
a first grasping member and a second grasping member arranged on a distal end side of the sheath, the first grasping member having a first grasping surface and the second grasping member having a second grasping surface, the first grasping surface and the second grasping surface being configured to grasp a living tissue;
a pair of electrodes arranged on at least one of the first grasping surface and the second grasping surface, the pair of electrodes being configured to function as a bipolar electrode; and
a cover configured to cover at least a part of a region of at least one of the first and second grasping members, wherein:
the monopolar electrode is positioned between a peripheral surface of the first grasping member and an inner surface of the cover facing the peripheral surface of the grasping member such that the monopolar electrode does not protrude from a cover.

19. The treatment instrument according to claim 18, further comprising:
a holding case located on a side of the proximal end of the sheath, and the holding case includes an output switching lever configured to switch between a monopolar output and a bipolar output.

* * * * *